(12) United States Patent
Miyoshi

(10) Patent No.: US 8,392,645 B2
(45) Date of Patent: Mar. 5, 2013

(54) SWITCH SYSTEM, SUB-SWITCH AND METHOD OF CONTROLLING SWITCH SYSTEM

(75) Inventor: Takashi Miyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 371 days.

(21) Appl. No.: 12/728,667

(22) Filed: Mar. 22, 2010

(65) Prior Publication Data

US 2010/0250807 A1 Sep. 30, 2010

(30) Foreign Application Priority Data

Mar. 25, 2009 (JP) .................. 2009-074287

(51) Int. Cl.
*G06F 13/36* (2006.01)
(52) U.S. Cl. .................. 710/312; 710/104; 710/316
(58) Field of Classification Search .................. 710/104, 710/303, 305, 310–315
See application file for complete search history.

(56) References Cited

U.S. PATENT DOCUMENTS

| | | | | |
|---|---|---|---|---|
| 5,128,664 A * | 7/1992 | Bishop | ............................ | 340/9.1 |
| 5,761,462 A * | 6/1998 | Neal et al. | ...................... | 710/306 |
| 5,764,924 A * | 6/1998 | Hong | ............................ | 710/300 |
| 5,781,747 A * | 7/1998 | Smith et al. | .................... | 710/300 |
| 5,881,253 A * | 3/1999 | Seeman | ............................ | 710/310 |
| 5,898,888 A * | 4/1999 | Guthrie et al. | ................ | 710/312 |
| 6,195,717 B1 * | 2/2001 | Henderson et al. | ........... | 710/312 |
| 6,233,641 B1 * | 5/2001 | Graham et al. | ................ | 710/316 |
| 6,249,834 B1 * | 6/2001 | Henderson et al. | ........... | 710/313 |
| 6,418,504 B2 * | 7/2002 | Conway et al. | ................ | 710/313 |
| 6,425,033 B1 * | 7/2002 | Conway et al. | ................ | 710/305 |
| 6,567,876 B1 * | 5/2003 | Stufflebeam | .................. | 710/303 |
| 6,606,678 B1 * | 8/2003 | Nakamura | ...................... | 710/305 |
| 6,675,237 B1 * | 1/2004 | Asaad et al. | ..................... | 710/41 |
| 6,687,779 B1 * | 2/2004 | Sturm et al. | .................. | 710/305 |

(Continued)

FOREIGN PATENT DOCUMENTS

| | | |
|---|---|---|
| JP | 2001-125694 A | 5/2001 |
| JP | 2004-326790 A | 11/2004 |

(Continued)

OTHER PUBLICATIONS

PCI Special Interest Group. PCI Local Bus Specification. Revision 2.1. Jun. 1, 1995.*

(Continued)

*Primary Examiner* — Matthew D Spittle
(74) *Attorney, Agent, or Firm* — Fujitsu Patent Center

(57) ABSTRACT

A switch system has a master sub-switch and a slave sub-switch, the master sub-switch having a first bridge for transmitting the received packet via the first bus, a second bridge for transmitting the packet when the address information of the second bridge matches with the address information included in the packet, and a third bridge for receiving the packet from the first bridge and transmitting the packet to the slave sub-switch, the slave sub-switch having a fourth bridge for receiving the packet from the third bridge and transmitting the packet, and a fifth bridge for receiving the packet from the fourth bridge, and transmitting the packet when the address information of the fifth bridge matches with the address information included in the packet, wherein the master sub-switch has a table including address information of the fifth bridge, and transmits the packet to the fifth bridge in reference to the table.

10 Claims, 28 Drawing Sheets

U.S. PATENT DOCUMENTS

| | | | | |
|---|---|---|---|---|
| 6,968,464 | B2 * | 11/2005 | Gardiner et al. | 713/300 |
| 6,996,658 | B2 * | 2/2006 | Brocco et al. | 710/312 |
| 7,062,594 | B1 * | 6/2006 | Sardella et al. | 710/314 |
| 7,096,305 | B2 * | 8/2006 | Moll | 710/312 |
| 7,478,176 | B2 * | 1/2009 | Zimmer et al. | 710/8 |
| 7,669,064 | B2 * | 2/2010 | Johnson et al. | 713/300 |
| 7,725,632 | B2 * | 5/2010 | Baba et al. | 710/104 |
| 8,006,024 | B2 * | 8/2011 | Brocco et al. | 710/315 |
| 2003/0065869 | A1 * | 4/2003 | Balay et al. | 710/314 |
| 2004/0221041 | A1 | 11/2004 | Tabbara | |
| 2007/0291642 | A1 | 12/2007 | Orii | |

FOREIGN PATENT DOCUMENTS

JP  2007-334764 A  12/2007

OTHER PUBLICATIONS

Intel Corporation. 21050 PCI-to-PCI Bridge Hardware Implementation. Application Note. Aug. 1998.*
NXP. SC18IS602B. Product Data Sheet. Rev. 5. Aug. 3, 2010.*
Budruk et al. PCI Express System Architecture. MindShare, Inc. 2003.*

* cited by examiner

| SW # | PORT # | DEV # | BUS # | ADDRESS RANGE | BUS RANGE |
|---|---|---|---|---|---|
| SW 0 | P1 | D0 | B0 | A0_L–A0_U | N1_L–N1_U |
| SW 0 | P2 | D1 | B1 | A1_L–A1_U | N2_L–N2_U |
| SW 0 | P3 | D2 | B2 | A2_L–A2_U | N2_L–N2_U |
| SW 1 | P4 | D3 | B3 | A3_L–A3_U | N3_L–N3_U |
| SW 1 | P5 | D4 | B4 | A4_L–A4_U | N4_L–N4_U |
| SW 1 | P6 | D5 | B5 | A5_L–A5_U | N5_L–N5_U |
| SW 1 | P7 | D6 | B6 | A6_L–A6_U | N6_L–N6_U |

| PTN # | SW # | PORT # | TRNS PORT # | DOWN STREAM PORTS |
|---|---|---|---|---|
| 0 | SW 0 | P1 | P0 | P3, P4, P5 |
| 1 | SW 0 | P2 | P0 | P6 |
| 2 | SW 1 | P1 | P1 | P7, P8 |

602  604  606  608  610

SWITCH SYSTEM, SUB-SWITCH AND METHOD OF CONTROLLING SWITCH SYSTEM

CROSS-REFERENCE TO RELATED APPLICATION

This application is based upon and claims the benefit of priority of the prior Japanese Patent Application No. 2009-074287, filed on Mar. 25, 2009, the entire contents of which are incorporated herein by reference.

FIELD

The present art relates to a switch system, a sub-switch and a method of controlling the switch system.

BACKGROUND

One example of an input/output (I/O) bus that connects an information processing device and an I/O device is a PCI Express (peripheral component interconnect express) bus. The PCI Express has a tree structure with a host bridge located at the root and an I/O device located at an endpoint. When multiple I/O devices are connected, a PCI express switch is required at an intermediate point in the tree structure. The PCI Express switch has a two-level tree structure in which ports serve as PCI-to-PCI (P2P) bridges. Unique numbers are assigned from an OS (operating system)/BIOS (basic input/output system) to devices included in the PCI Express.

A switch that supports a large number of ports is required in order to connect a large number of I/O devices in a single system. However, when the number of ports is merely increased in a single switch LSI (large scale integration), cost for LSI design and manufacture and printed-circuit-board implementation increases. Accordingly, multiple PCI Express switches are simply connected to increase the number of ports in order to connect a large number of I/O devices. When the switches are connected, the PCI Express hierarchical structure is determined depending on which switch is closer to a host bridge. That is, during start of an information processing device, the bus hierarchical levels of the switches are seen differently from the OS/BIOS. However, since the bus hierarchical levels are finite, the depth of the bus hierarchical levels that can be supported by the OS/BIOS is also limited.

SUMMARY

According to an aspect of an embodiment, a switch system connectable to a first I/O device, a second I/O device, and a third I/O device, has a master sub-switch and a slave sub-switch, the master sub-switch having a first bus, a first bridge connected to the first bus for receiving a packet from the first I/O device and transmitting the received packet to the first bus, the first bridge being capable of transmitting a request to the first bus so as to inquire whether there is any bridge addressed by the packet via the first bus, the first bridge being capable of receiving an acknowledge from any bridge addressed by the packet via the first bus before transmitting the packet to the first bus, a second bridge connected to the first bus for receiving the packet from the first bridge via the first bus, comparing address information of the second bridge with address information included in the packet, and transmitting the packet to the second I/O device when the address information of the second bridge matches with the address information included in the packet, and a third bridge connected to the first bus for receiving the packet from the first bridge via the first bus and transmitting the packet to the slave sub-switch, the slave sub-switch having a second bus, a fourth bridge for receiving the packet from the third bridge and transmitting the packet via the second bus, and a fifth bridge for receiving the packet from the fourth bridge to the second bus, comparing address information of the fifth bridge with address information included in the packet, and transmitting the packet to the third I/O device when the address information of the fifth bridge matches with the address information included in the packet, wherein the master sub-switch has a table including address information of the fifth bridge, and the first bridge determines whether the address information included in the packet matches with the address information of the fifth bridge or not in reference to the table, and transmits the packet to the fifth bridge when the address information included in the packet matches with the address information of the fifth bridge.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 illustrates a configuration information table;

FIG. 25 illustrates a partition table in the second embodiment;

DESCRIPTION OF EMBODIMENTS

Embodiments of the present art will be described below with reference to the accompanying drawings.

Figure 1:
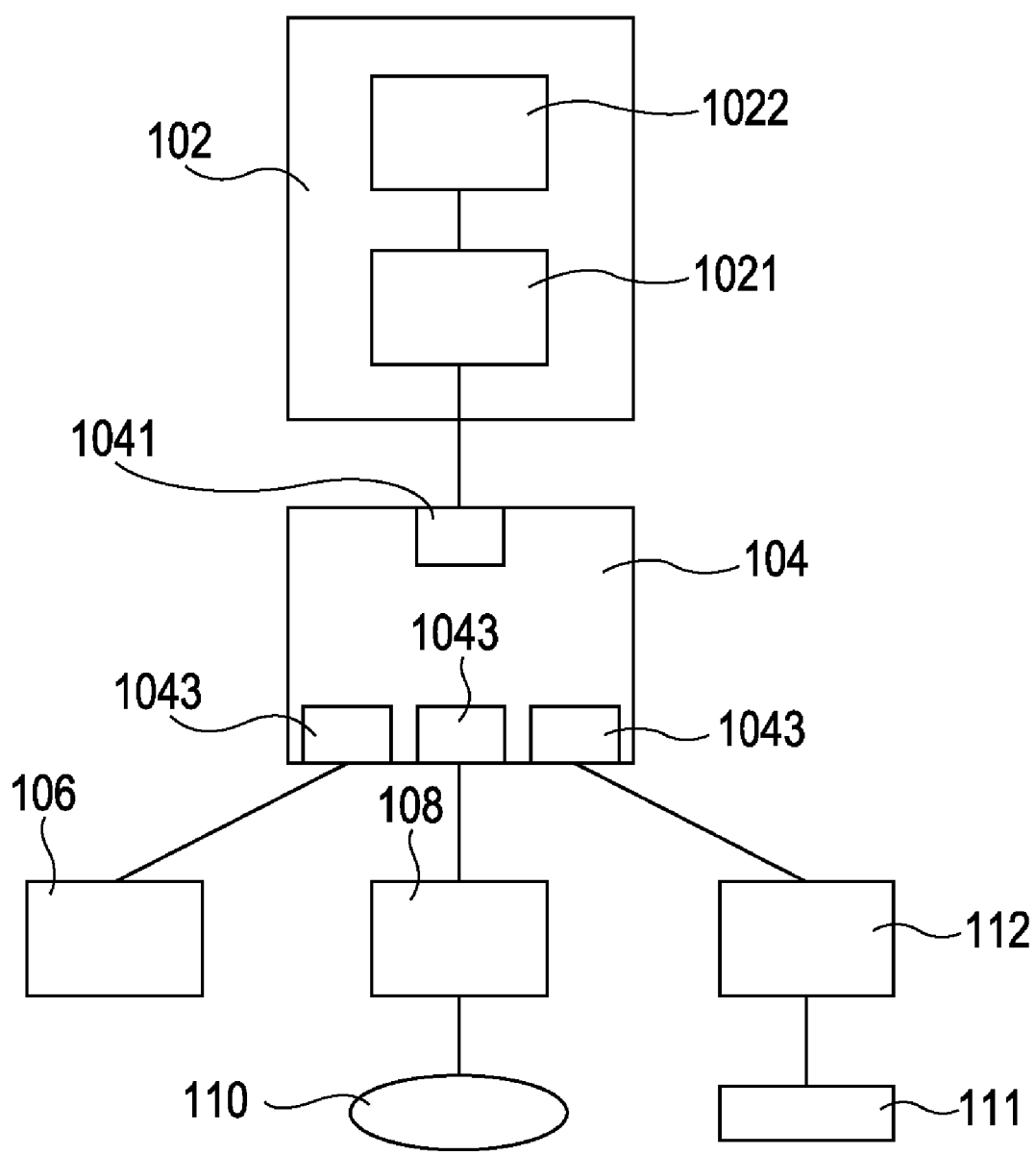
FIG. 1 is a diagram of a system according to a first embodiment of the present art.

FIG. 1 is a block diagram of a system 100 according to a first embodiment of the present art. The system 100 includes a host 102, a PCI Express (PCIe) switch 104, an I/O (Input/Output) device 106, a network interface card (NIC) 108, a network 110, a host bus adapter (HBA) 112, and a disk 111.

The system 100 has a tree structure having its root at a host bridge 1021. Leaf elements are called endpoints (EPs). The host 102 has a central processing unit (CPU) 1022 and the host bridge 1021.

The host 102 performs data processing. The CPU 1022 is connected to the host bridge 1021. The host bridge 1021 interconnects the CPU 1022 and a PCI bus to perform data control. The host bridge 1021 is connected to the PCIe switch 104. The PCIe switch 104 connects the host 102 with the I/O device 106, the NIC 108, and the HBA 112, which are endpoints.

The NIC 108 is an extension card for connecting the PCIe switch 104 with the network 110, which may be a local area network (LAN). The NIC 108 is connected to the network 110. The HBA 112 is an adapter for connecting the PCIe switch 104 with the disk 111. The HBA 112 is connected to the disk 111. Information is stored on the disk 111.

Figure 2:
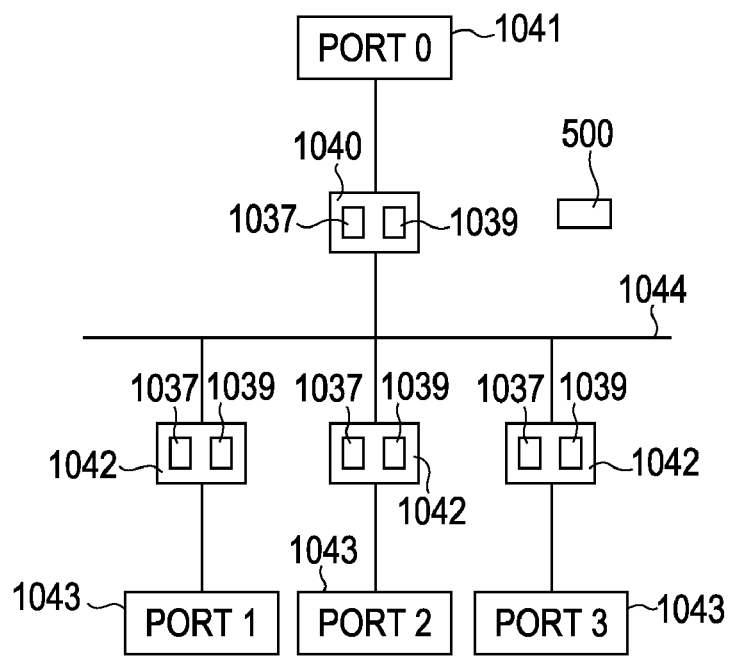
FIG. 2 is a diagram of a PCIe system in the first embodiment.

FIG. 2 is a block diagram of the PCIe switch 104 in the present embodiment. The PCIe switch 104 has an upstream port 1041, an upstream P2P (PCI-to-PCI) bridge 1040, downstream P2P bridges 1042, and downstream ports 1043. The upstream port 1041 is connected to the upstream P2P bridges 1040. The upstream P2P bridge 1040 and the downstream P2P bridges 1042 are interconnected through an internal PCI bus 1044. The downstream P2P bridges 1042 are connected to the corresponding downstream ports 1043. The PCIe switch 104, which serves as a master switch, has a configuration information table 500. The configuration information table 500 is described below.

The upstream port 1041 and the downstream ports 1043, which are physical ports, control PCIe links to perform data transfer. The PCIe links are communication channels with other devices.

The upstream P2P bridge 1040 and the downstream P2P bridges 1042 perform packet transfer and ordering. Each of the upstream P2P bridge 1040 and the downstream P2P bridges 1042 is broadly classified into an upstream portion and a downstream portion. The PCIe switch 104 has one upstream P2P bridge 1040. Bus numbers 508, device numbers 506, and function numbers 509 are assigned to the upstream portions of the upstream P2P bridge 1040 and the downstream P2P bridges 1042. The bus numbers 508 are assigned from an OS/BIOS. The device numbers 506 indicate relative port numbers after connection with the PCIe switch 104. The function numbers 509 are assigned to respective functions of devices. The downstream portions of the upstream P2P bridge 1040 and the downstream P2P bridges 1042 have range information of the bus numbers 508 to be assigned. The downstream portions of the upstream P2P bridge 1040 and the downstream P2P bridges 1042 also have information of a first address and a size of address space to be assigned. The upstream P2P bridge 1040 is capable of transmitting a request to a first bus so as to inquire whether there is any bridge addressed by the packet to the first bus, the upstream P2P bridge 1040 being capable of receiving an acknowledge from any bridge address by the packet to the first bus before transmitting the packet to the first bus.

Each of the upstream P2P bridge 1040 and the downstream P2P bridges 1042 has a state machine 1037 and a register 1039. The register 1039 stores a bus number and so on of a device connected downstream. For example, by referring to a bus number in a packet transmitted from the host 102 and a bus number stored by the register 1039, the state machine 1037 determines the destination of the packet.

Figure 3:
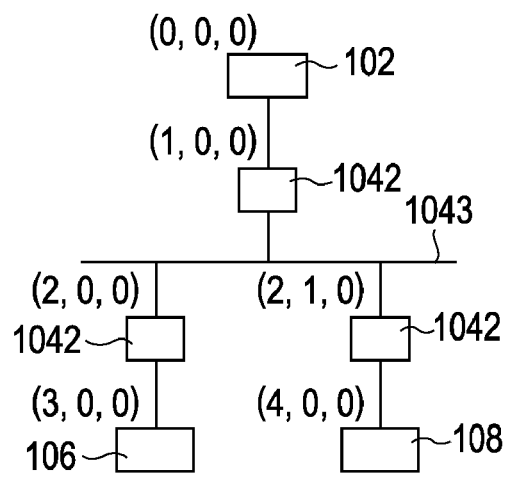
FIG. 3 illustrates a system tree in the first embodiment.

FIG. 3 illustrates one example of a system tree 200 in the present embodiment. Bus numbers, device numbers, and function numbers are assigned to devices included in the system tree 200. Unique bus numbers are assigned to PCIe links and an internal bus. The term "internal bus" herein refers to a bus that interconnects P2P bridges in devices. The bus numbers are finite resources and the total number of bus segments is 256. The P2P bridge divides the bus segments. The bus segments are divided into an upstream side and a downstream side across the P2P bridge. The bus segments that are closer to the host 102 are at the upstream side and the bus segments that are farther from the host 102 are at the downstream side. The distance of the downstream P2P bridge 1042 from the host 102 is defined as depth of the hierarchy.

Figure 4:
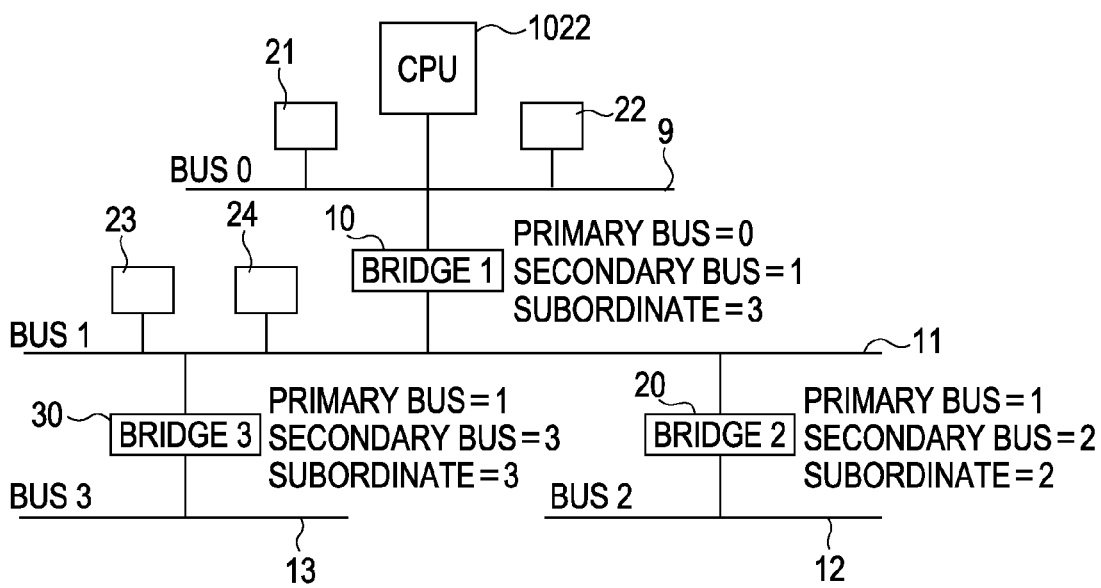
FIG. 4 illustrates how bus numbers are assigned.

How the OS assigns bus numbers to bridges will now be described with reference to FIG. 4. A system 210 includes a CPU 1022, a bridge 1 10, a bridge 2 20, a bridge 3 30, and devices 21, 22, 23, and 24. The CPU 1022, the bridge 1 10, and the device 21 and 22 are interconnected through a bus 0 9. The bridge 1 10, the devices 23 and 24, the bridge 2 20, and the bridge 3 30 are interconnected through a bus 1 11. A bus 2 12 is further connected to the bridge 2 20 and a bus 3 13 is connected to the bridge 3 30. Ports are not illustrated in the system 210.

The OS performs scanning to find the bridge 1 10 as a first bridge. For example, a depthwise algorithm is used as a method for the scanning. The OS assigns a bus number of 1 to the bus 1 11 located downstream of the bridge 1 10. The bridge 1 10 is assigned a primary bus number of 0, which is a bus number immediately upstream of the bridge 1 10. The bridge 1 10 is assigned a secondary bus number of 1, which is a bus number immediately downstream of the bridge 1 10. In addition, the bridge 1 10 is temporarily assigned a subordinate bus number of 0xFF, which is the largest one of the numbers of reachable buses located downstream of the bridge 1 10. This means that a type 1 PCI configuration address specifying a bus number of 1 or larger is passed to the bus 1 11 across the bridge 1 10. When a packet has a bus number of 1, type 1 is converted into type 0. However, when a packet has a number other than a bus number of 1, type 1 is not converted into type 0.

The OS proceeds the scanning to the bus 1 11. In this case, the OS finds the bridge 2 20. The OS assigns a primary bus number of 1 to the bridge 2 20 and a secondary bus number of 2 to the bridge 2 20. Since no new bridge exists downstream of the bridge 2 20, the OS assigns a subordinate bus number of 2 to the bridge 2 20.

The OS returns to scanning of the bus 1 11 and finds the bridge 3 30. The OS assigns a primary bus number of 1 and a secondary bus number of 3 to the bridge 3 30. Since no bridge exists downstream of the bridge 3 30, the OS assigns a subordinate bus number of 3 to the bridge 3 30. Lastly, the OS assigns a subordinate bus number of 3 to the bridge 1 10.

Figure 5:
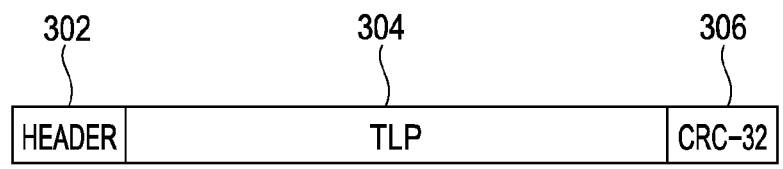
FIG. 5 is a diagram illustrating one example of a packet format in the first embodiment.

FIG. 5 illustrates one example of the format of a packet. A packet 300 has a header 302, a transaction layer packet (TLP) 304, and a cyclic redundancy check (CRC-32) 306. The header 302 is used for identifying the start of the packet. The TLP 304 is a packet for transmission and reception of a command and data and includes a destination address or a bus number. The CRC-32 306 is an error detection code. In the present embodiment, for example, the header 302 has 2 bytes, the TLP 304 has 12 to 4116 bytes, and the CRC-32 306 has 4 bytes.

There are an address routing scheme and an ID (identifier) routing scheme as a packet routing scheme. The address routing scheme is a scheme in which the destination port of a packet is specified by a destination address. The packet is transferred to a downstream P2P bridge having the destination address in its downstream address space. When no corresponding P2P bridge exists, a packet is transferred to an upstream bridge. The ID routing scheme is a scheme in which the destination port of a packet is specified by a set of a bus number, a device number, and a function number. The packet is transferred to a downstream P2P bridge having a corresponding bus number at the downstream thereof.

The packet is broadly classified into three types: a configuration read/write (R/W) packet, a memory read/write (R/W) packet, and a message packet. The configuration read/write packet represents reading or writing of device information and is used for configuration access. The memory read/write packet represents data reading or writing. The message packet represents an interruption. The term "configuration access" herein refers to a configuration transaction issued from the OS/BIOS. The configuration access is a transaction for allowing the OS/BIOS to set bus numbers for the P2P bridges and the I/O devices and to obtain vender information and for setting enabling/disabling of direct access memory on the P2P bridges and the I/O devices. Configuration information of PCIe devices including a PCIe switch is set by the configuration access.

In addition, the configuration access is classified into type 0 and type 1. The type 0 configuration access does not contain a bus number. The type 0 configuration access is interpreted by all devices as a configuration address on the PCI device. The type 1 configuration access contains a bus number. The type 1 configuration access is ignored by all PCIe devices except P2P bridges. Each P2P bridge that refers to the type 1 configuration address transfers a packet downstream.

Figure 6:
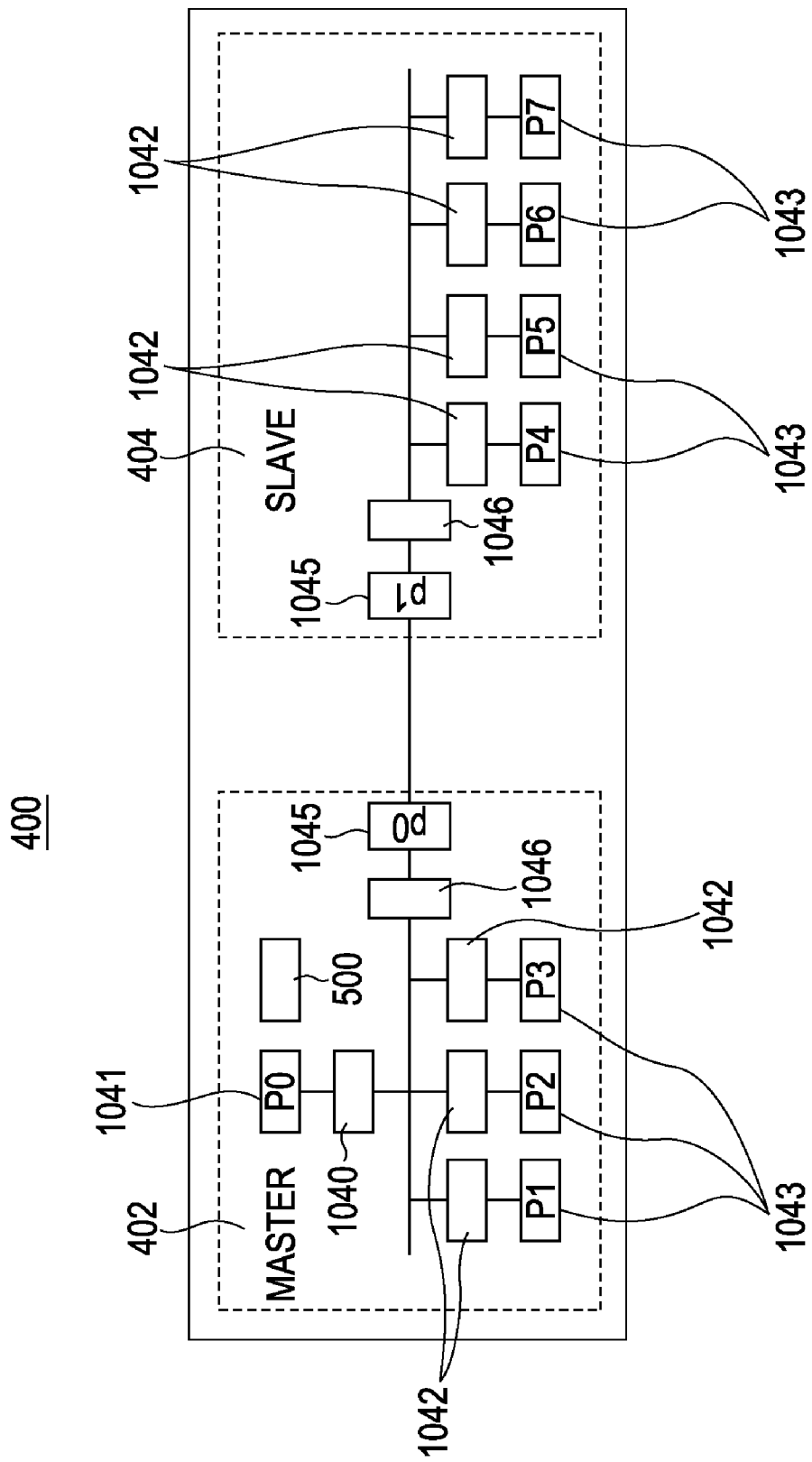
FIG. 6 is a diagram of a switch system in the first embodiment.
Figure 7:
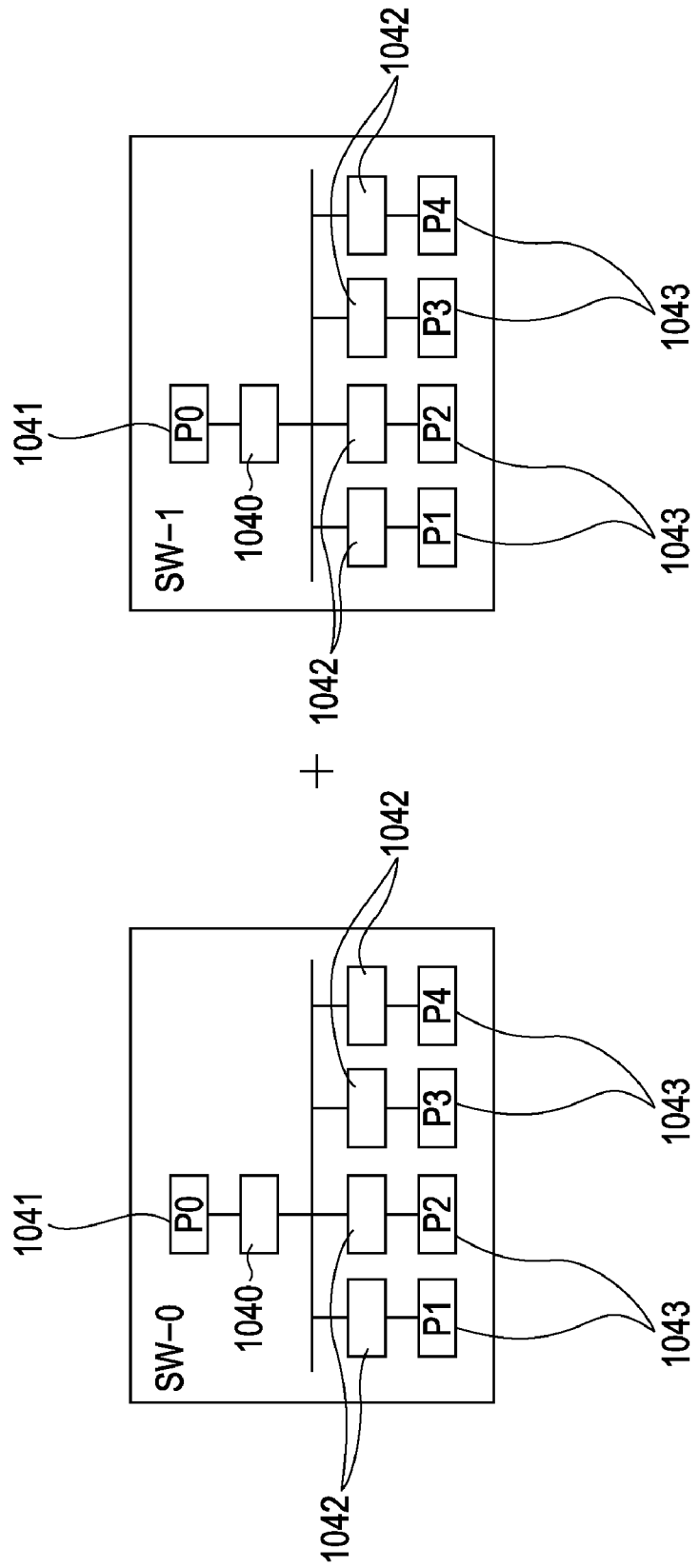
FIG. 7 is a diagram of switches before connection in the first embodiment.

FIG. 6 illustrates a switch system 400 in the present embodiment. The switch system 400 illustrated in FIG. 6 has a configuration in which two switches illustrated in FIG. 7 are connected. Of switches to be connected, a switch that is the closest to the host bridge 1021 is referred to as a master switch 402. Another switch is referred to as a slave switch 404. A dedicated link that is called a virtual link provides a connection between the master switch 402 and the slave switch 404. Ports to which the virtual link is connected are referred to as virtual ports 1045. When N switches are connected in the system, the master switch 402 has N−1 virtual ports 1045 and the slave switch 404 has one virtual port.

A P2P bridge 1046 is connected to each virtual port 1045. The P2P bridge 1046 first determines whether or not a command transmitted from the OS/BIOS is a configuration access command. When the command is a configuration access command, the corresponding virtual port 1045 transmits the command to the connected switch. In this manner, the P2P bridge 1046 connected to the virtual port 1045 directly transfers a configuration access command to the opposing switch through the virtual link without terminating the configuration access transmitted from the OS/BIOS. Conversion from type 1 to type 0 is not also performed. This operation prevents the OS/BIOS from recognizing the virtual link hierarchy. The P2P bridge 1046 directly transfers all transactions to the virtual link that connects the PCI Express switches, without making changes to the transactions. The same applies to the configuration access. The virtual ports and the virtual link do not depend on a PCI Express protocol. As an illustrative example of the virtual ports, a closed PCI Express bus can be used for the virtual ports and the virtual link. That is, the provision of address space that is independent from the OS/BIOS achieves the above-described function.

The state machine 1037 illustrated in FIG. 2 determines whether or not a packet is requesting access to the register 1039 to thereby determine whether or not a command transmitted from the OS/BIOS is a configuration access command. When a command transmitted from the OS/BIOS is a configuration access command, the state machine 1037 transmits the packet without allowing packet to access the register 1039. The processing in which the P2P bridge 1046 connected to the virtual port 1045 determines whether or not a command transmitted from the OS/BIOS is a configuration access command may be realized by, for example, firmware.

Figure 8:
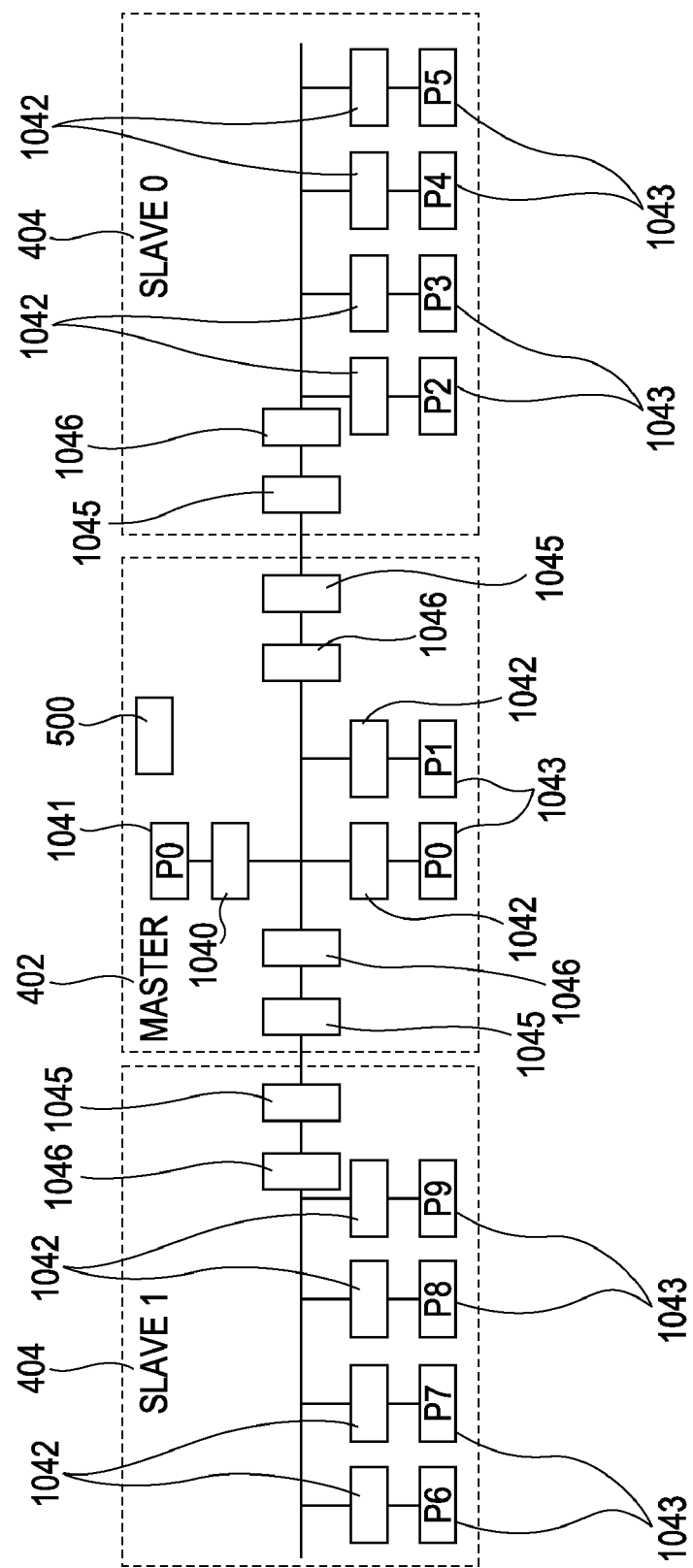
FIG. 8 is a diagram of a switch system in the first embodiment.
Figure 9:
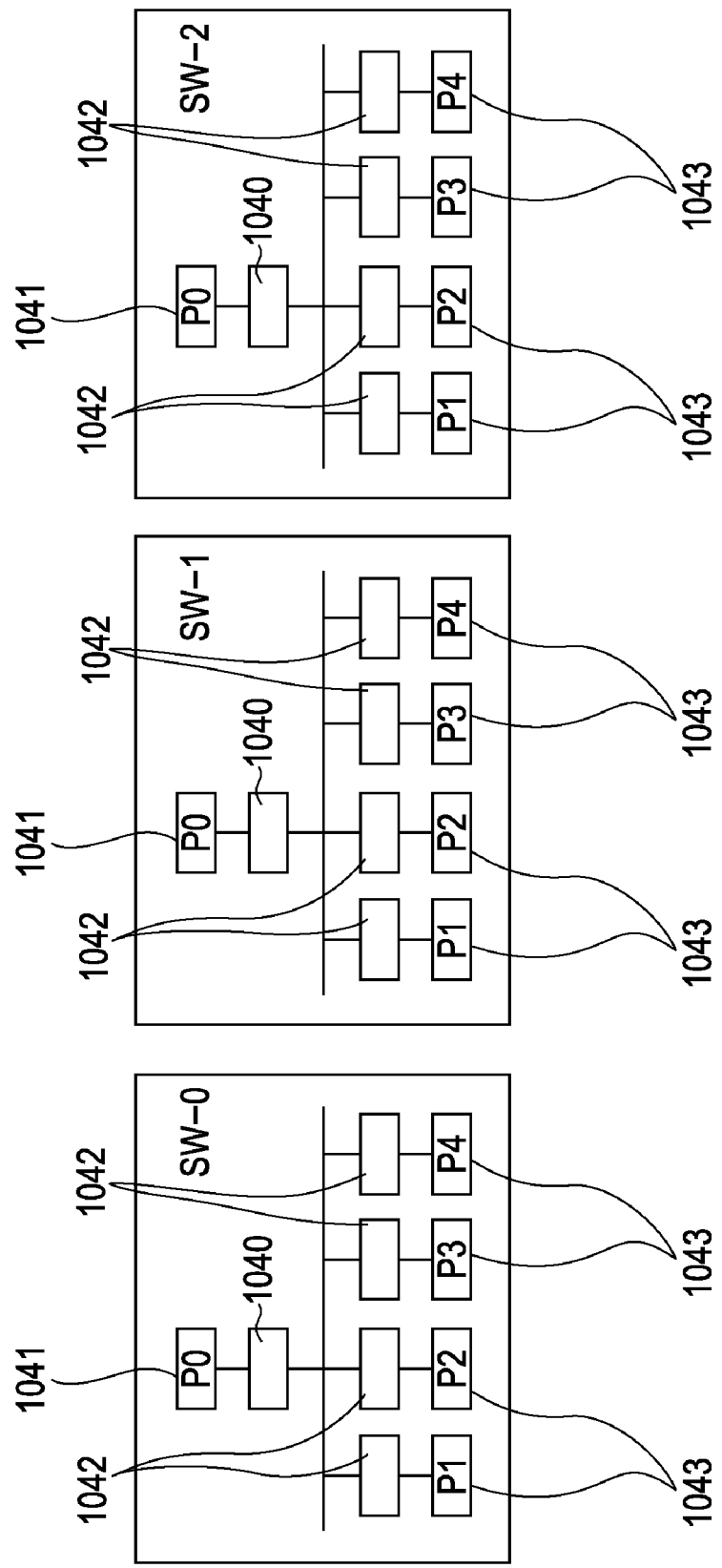
FIG. 9 is a diagram of switches before connection in the first embodiment.

FIG. 8 illustrates a switch system 401 in the present embodiment. The switch system 401 illustrated in FIG. 8 has a configuration in which three switches illustrated in FIG. 9 are connected.

Figure 10:
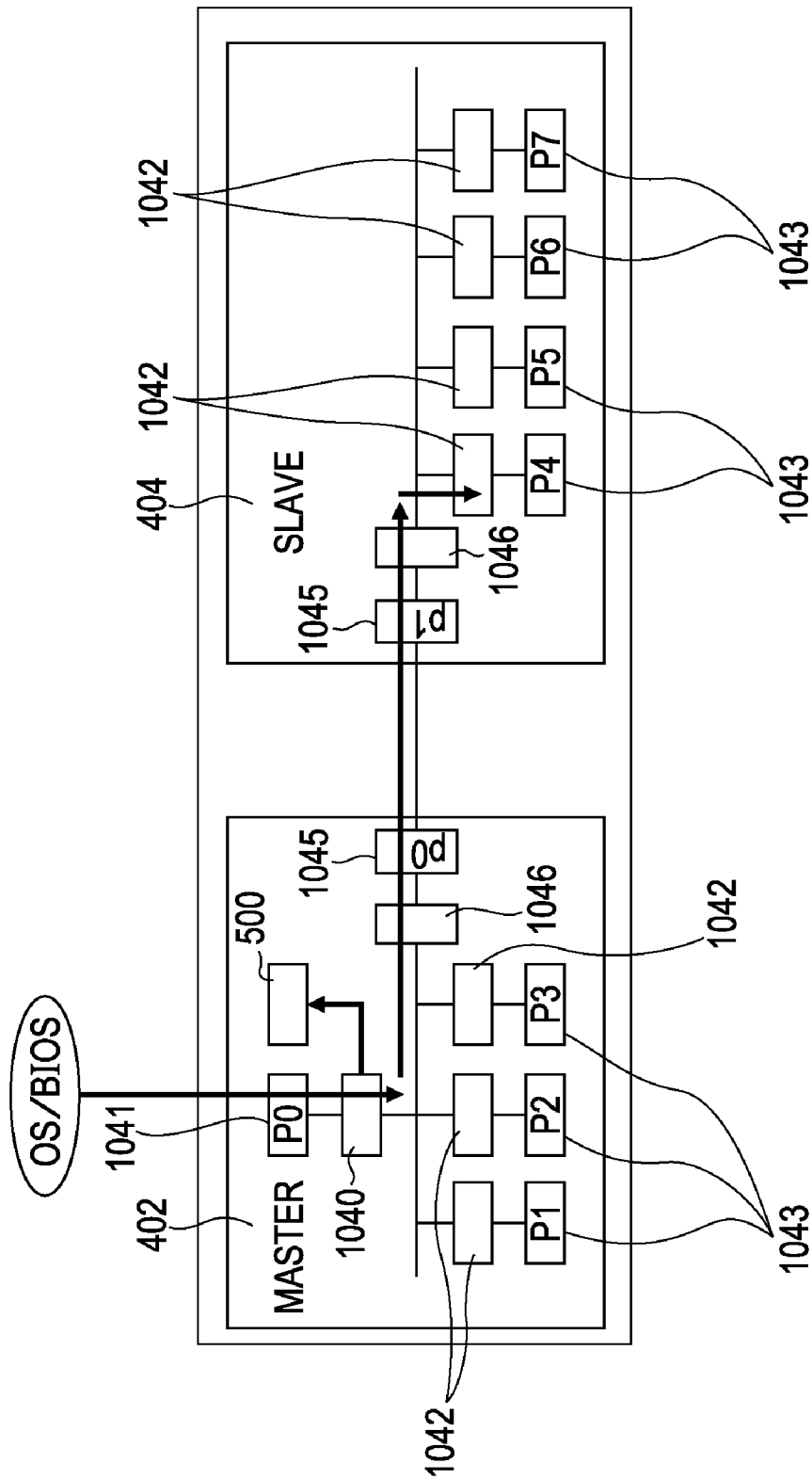
FIG. 10 is a diagram of switch system in the first embodiment.

FIG. 10 illustrates a switch system 410. A master switch 402 has configuration information of the master switch 402 and a slave switch 404 as a configuration information table 500. The configuration information table 500 is updated based on a configuration access issued by the OS/BIOS. The master switch 402 snoops a configuration access packet and uses information of the configuration access packet to create the configuration information table 500.

FIG. 11 illustrates the configuration information table 500. The configuration information table 500 has switch numbers 502, port numbers 504, device numbers 506, bus numbers 508, address range information 510, and bus range information 512. The switch numbers 502 are unique numbers in the system. Each port number 504 indicates a port position of each switch. Each device number 506 indicates a relative port number after connection. Each bus number 508 is assigned from the OS/BIOS. The address range information 510 is assigned from the OS/BIOS and indicates the range of address space located below a corresponding P2P bridge. The bus range information 512 is assigned from the OS/BIOS and indicates the range of PCI buses located below a corresponding P2P bridge.

Figure 12:
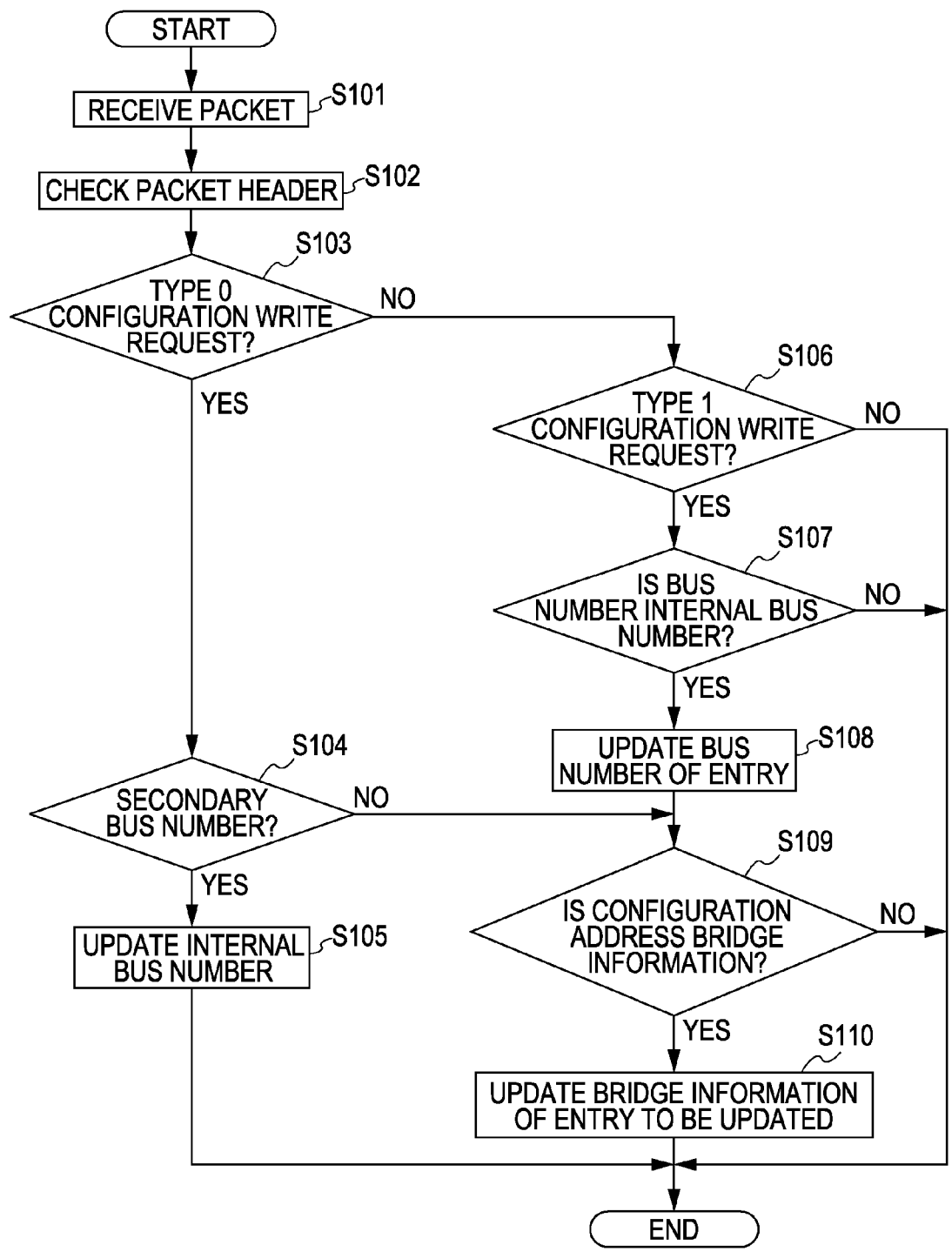
FIG. 12 is a flowchart illustrating processing for updating the configuration information table in the first embodiment.

Processing for updating the configuration information table will now be described with reference to FIG. 12. In step S101, the upstream P2P bridge 1040 of the master switch 402 receives a packet. The process then proceeds to step S102.

In step S102, the upstream P2P bridge 1040 checks the header of the received packet. The process then proceeds to step S103.

In step S103, the upstream P2P bridge 1040 refers to the header of the received packet to determine whether or not the received packet is a type 0 configuration write request. When the received packet is a type 0 configuration write request, the process proceeds to step S104. On the other hand, when the received packet is not a type 0 configuration write request, the process proceeds to step S106.

In step S104, the upstream P2P bridge 1040 refers to the header of the received packet to determine whether or not the configuration address of the received packet is a secondary bus number. The term "secondary bus number" refers to the number of a bus immediately downstream of the PCI bridge. When the configuration address of the received packet is a secondary bus number, the process proceeds to step S105. On the other hand, when the configuration address of the received packet is not a secondary bus number, the process proceeds to step S109.

In step S105, the upstream P2P bridge 1040 updates an internal bus number. The processing then ends.

When it is determined in step S103 described above that the received packet is not a type 0 configuration write request, the process proceeds to step S106.

In step S106, the upstream P2P bridge 1040 refers to the header of the received packet to determine whether or not the received packet is a type 1 configuration write request. When the received packet is a type 1 configuration write request, the process proceeds to step S107. On the other hand, when the received packet is not a type 1 configuration write request, the processing ends.

In step S107, the upstream P2P bridge 1040 refers to the header of the received packet to determine whether or not the bus number in the packet is an internal bus number. When the bus number in the packet is an internal bus number, the process proceeds to step S108. On the other hand, when the bus number in the packet is not an internal bus number, the processing ends.

In step S108, the upstream P2P bridge 1040 refers to the device number in the packet, sets an entry to be processed in the configuration information, and updates the bus number in the entry. The process then proceeds to step S109.

In step S109, the upstream P2P bridge 1040 determines whether or not the configuration address is bridge information by referring to the device number in the packet. When the configuration address is bridge information, the process proceeds to step S110. On the other hand, when the configuration address is not bridge information, the proceeding ends.

In step S110, the upstream P2P bridge 1040 updates the bridge information of the entry to be updated, the entry being set in step S108. The processing then ends.

Figure 13:
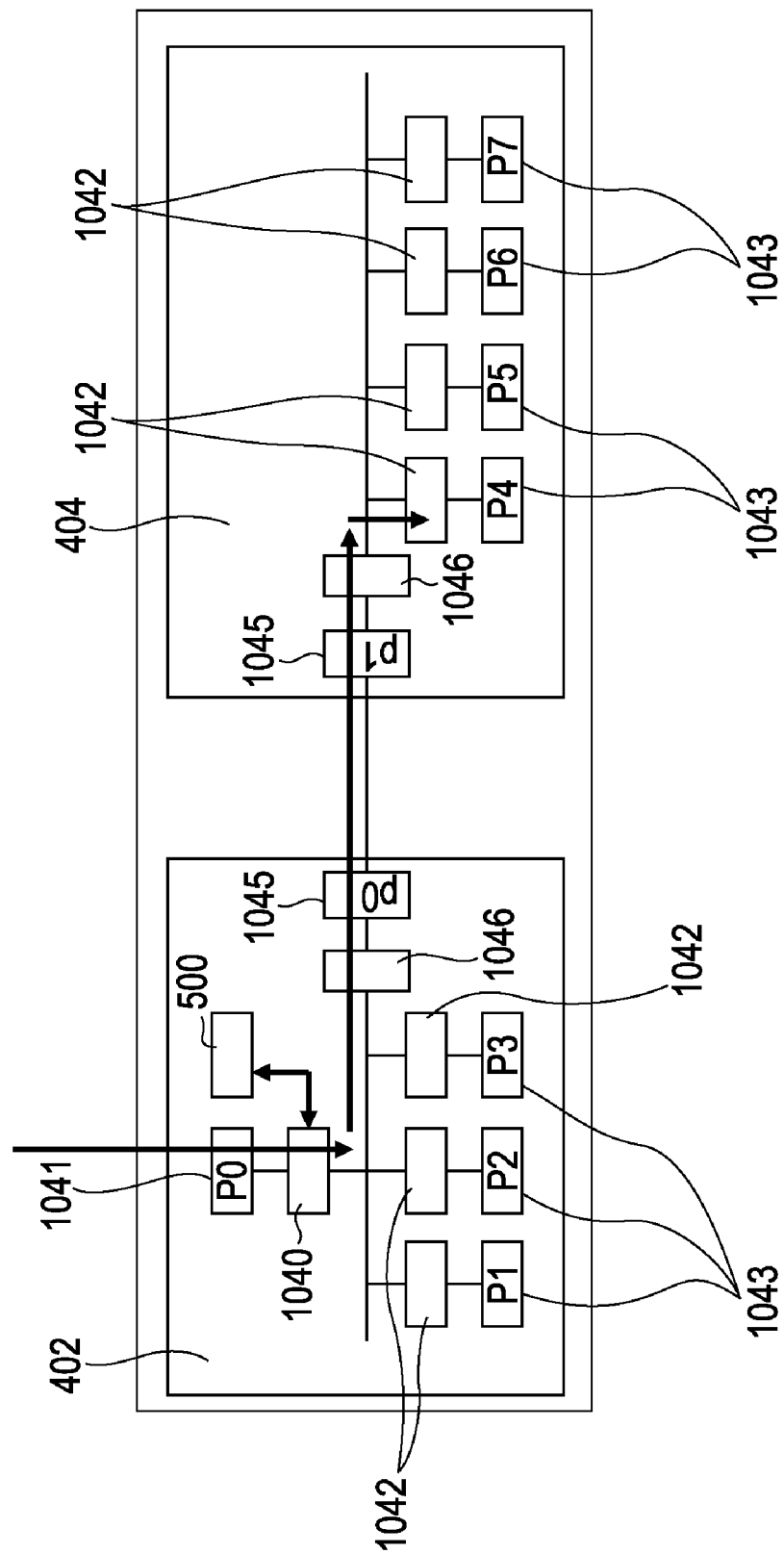
FIG. 13 is a diagram illustrating routing of a packet received by a master switch.
Figure 14:
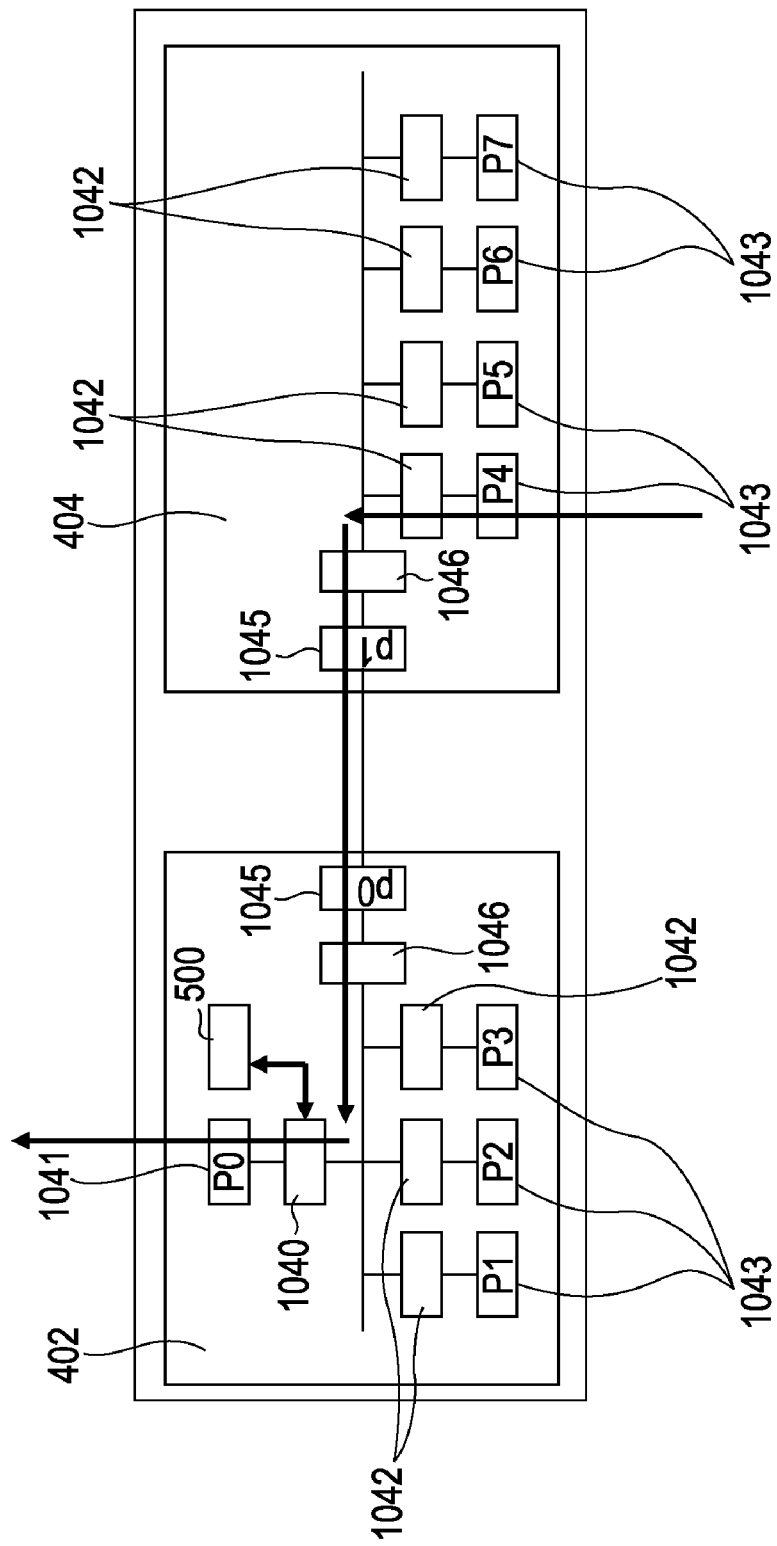
FIG. 14 is a diagram illustrating routing of a packet received by a slave switch.

A packet routing scheme will now be described with reference to FIGS. 13 and 14. FIG. 13 illustrates routing of a packet received at a port of the master switch 402. First, the header of a packet is analyzed at the reception port and a request is issued to the configuration information table 500 to resolve the destination. Depending on the type of packet, the configuration information table 500 determines the destination port of the packet on the basis of a number association table and bus range cache (ID routing) or address range cache (address routing). When the destination port of the packet is in the slave switch 404, the packet is transferred to the virtual port 1045 corresponding to the virtual link. The slave switch 404 performs processing that is analogous to that of a typical PCIe switch. On the other hand, FIG. 14 illustrates routing of a packet received at a port of the slave switch 404. The reception port transfers the packet to the master switch 402 through the virtual link. The master switch 402 routes the packet in accordance with the above-described procedure.

Figure 15:
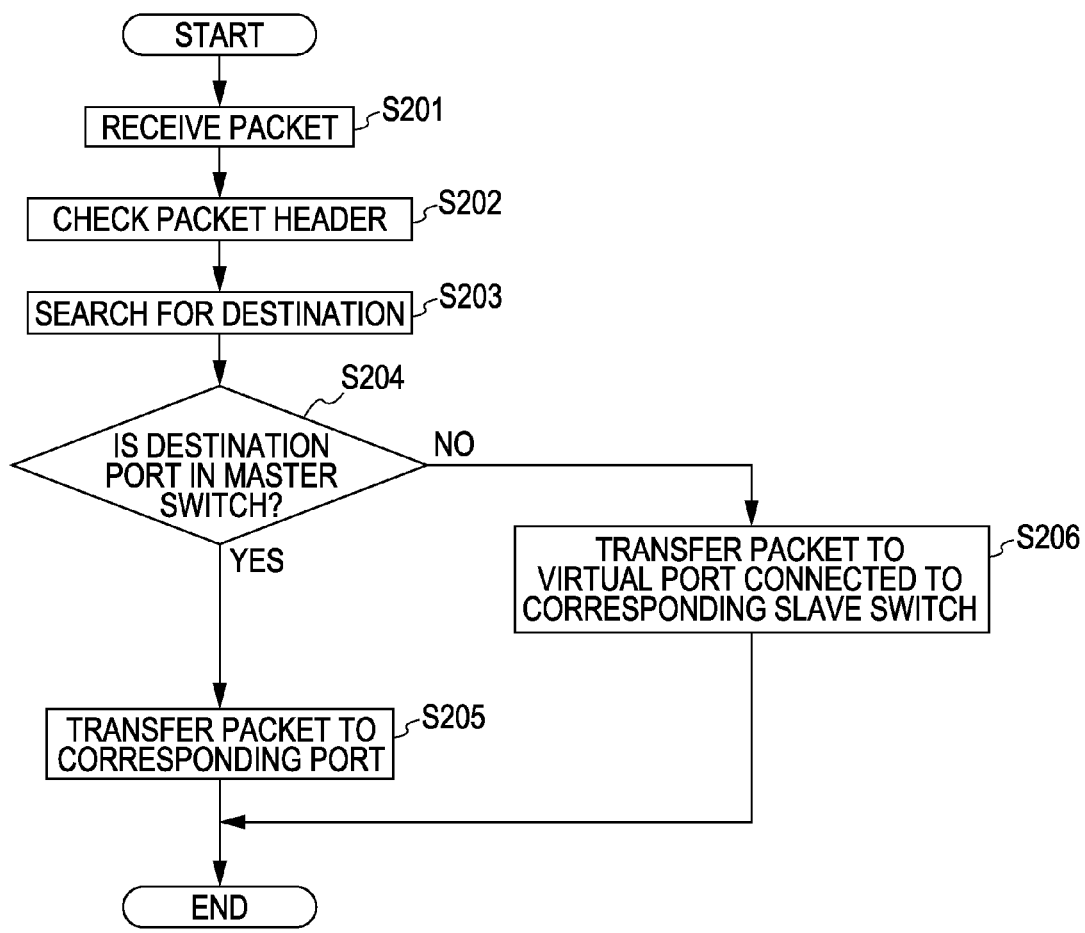
FIG. 15 is a flowchart illustrating packet transfer processing performed by the master switch.

Packet transfer processing performed by the master switch 402 will now be described with reference to FIG. 15.

In step S201, the upstream P2P bridge 1040 of the master switch 402 receives a packet. The process then proceeds to step S202.

In step S202, the upstream P2P bridge 1040 checks the header of the received packet. The process then proceeds to step S203.

In step S203, the upstream P2P bridge 1040 refers to the configuration information table 500 to search for the destination of the packet. Destination search processing is described below with reference to FIG. 17. After step S203, the process proceeds to step S204.

In step S204, the upstream P2P bridge 1040 determines whether or not the destination of the packet is in the master switch 402. When the destination of the packet is in the master switch 402, the process proceeds to step S205. On the other hand, when the destination of the packet is not in the master switch 402, the process proceeds to step S206.

In step S205, the upstream P2P bridge 1040 transfers the packet to a corresponding port in the master switch 402. The processing then ends.

In step S206, the upstream P2P bridge 1040 transfers the packet to a virtual port of the corresponding slave switch 404. The processing then ends.

Figure 16:
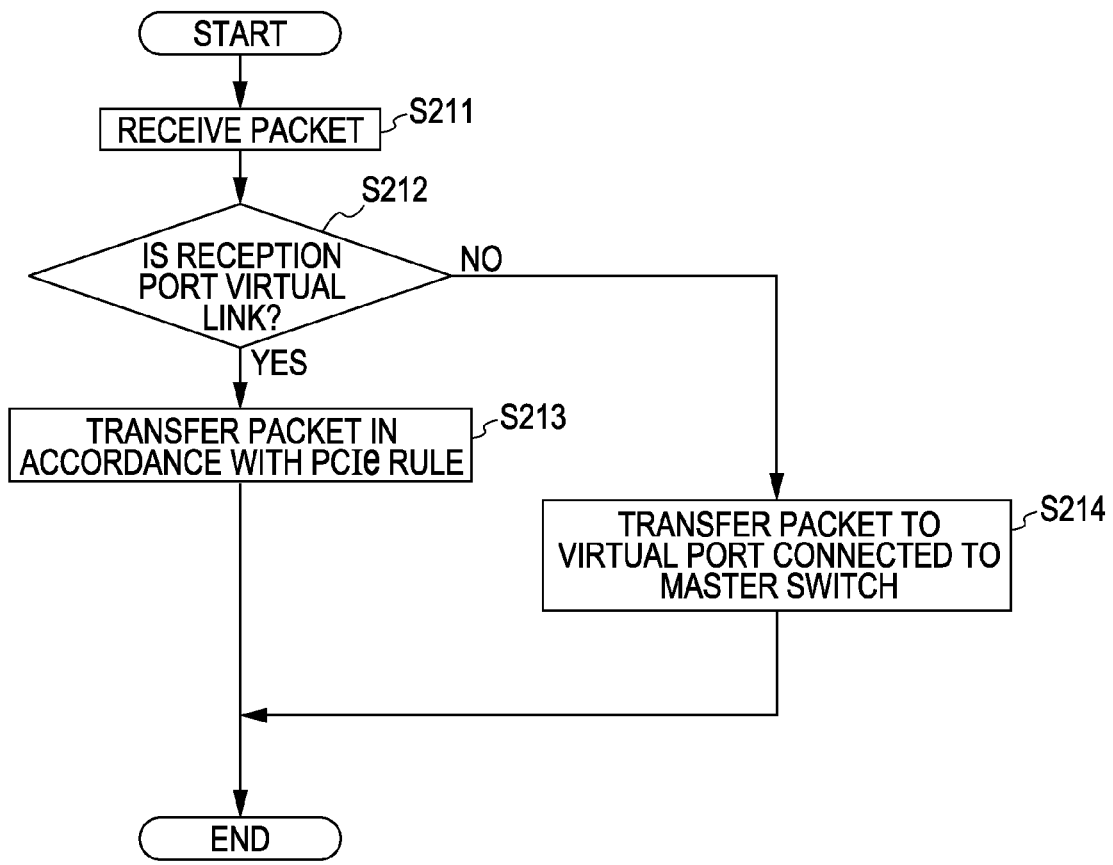
FIG. 16 is a flowchart illustrating packet transfer processing performed by the slave switch.

Packet transfer processing performed by the slave switch 404 will now be described with reference to FIG. 16.

In step S211, the downstream P2P bridge 1042 of the slave switch 404 receives a packet. The process then proceeds to step S212.

In step S212, the downstream P2P bridge 1042 determines whether or not the reception port is a virtual link. When the reception port is a virtual link, the process proceeds to step S213. On the other hand, when the reception port is not a virtual link, the process proceeds to step S214.

In step S213, the downstream P2P bridge 1042 transfers the packet in accordance with a PCI Express rule. The processing then ends.

In step S214, the downstream P2P bridge 1042 transfers the packet to the virtual port connected to the master switch 402. The processing then ends.

Figure 17:
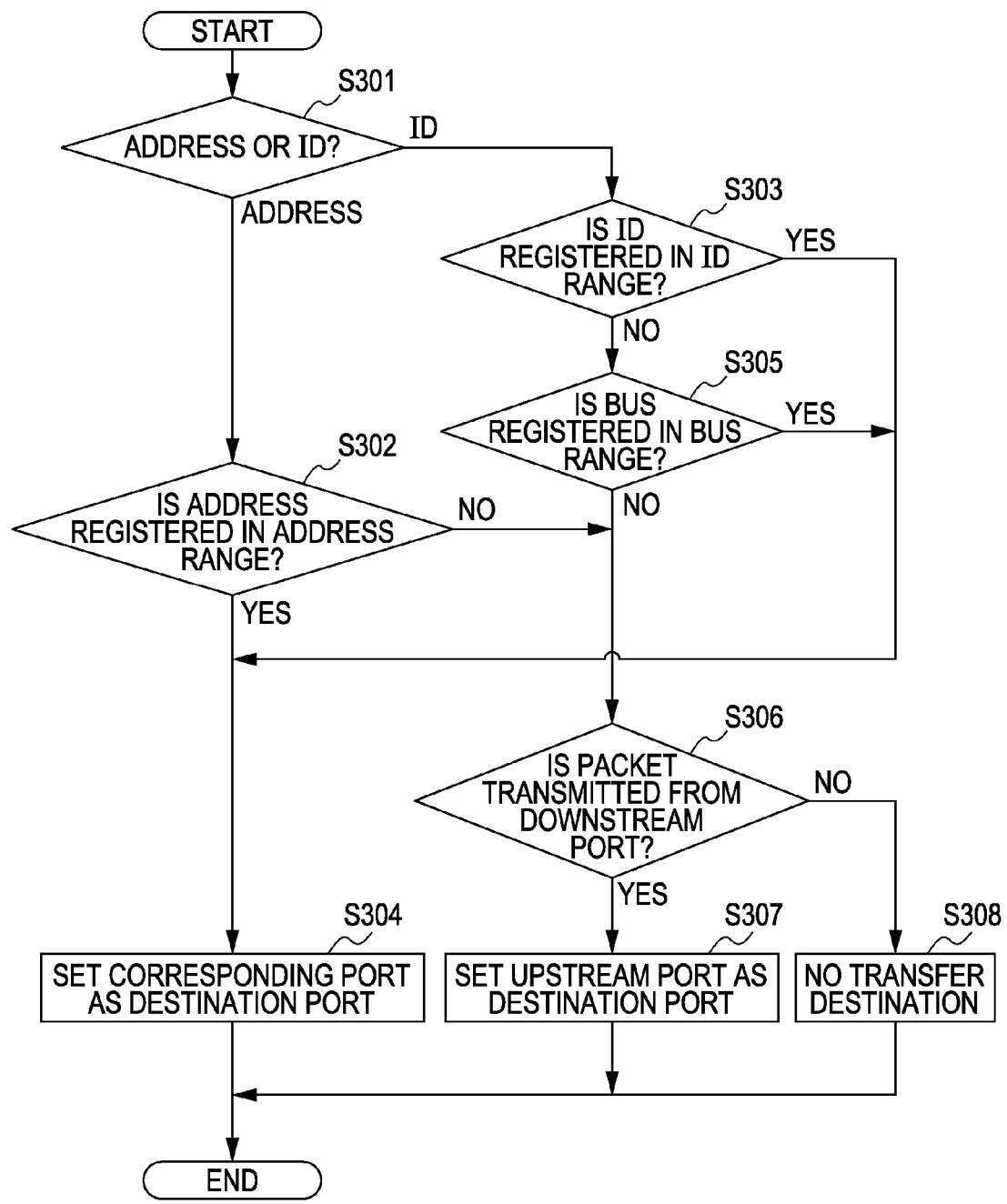
FIG. 17 is a flowchart illustrating packet destination search processing.

Packet destination search processing will now be described with reference to FIG. 17.

In step S301, the upstream P2P bridge 1040 determines whether or not the routing type of the packet is an address or ID. When the packet routing type is an address, the process proceeds to step S302. On the other hand, when the packet routing type is an ID, the process proceeds to step S303.

In step S302, the upstream P2P bridge 1040 determines whether or not the address in the packet is in the range of addresses registered in the configuration information table 500. When the address in the packet is in the range of addresses registered in the configuration information table 500, the process proceeds to step S304. On the other hand, when the address in the packet is not in the range of addresses registered in the configuration information table 500, the process proceeds to step S306.

In step S304, the upstream P2P bridge 1040 sets a corresponding port as the destination portion. The processing then ends.

In step S303, the upstream P2P bridge 1040 determines whether or not the ID of the packet is in the range of IDs registered in the configuration information table 500. When the ID of the packet is in the range of IDs registered in the configuration information table 500, the process proceeds to step S304 in which the upstream P2P bridge 1040 sets a corresponding port as the destination port. On the other hand, when the ID of the packet is not in the range of IDs registered in the configuration information table 500, the process proceeds to step S305.

In step S305, the upstream P2P bridge 1040 determines whether or not the bus of the packet is in the range of buses registered in the configuration information table 500. When the bus of the packet is in the range of buses registered in the configuration information table 500, the process proceeds to step S304 in which the upstream P2P bridge 1040 sets a corresponding port as the destination port. On the other hand, when the bus of the packet is not in the range of buses registered in the configuration information table 500, the process proceeds to step S306.

In step S306, the upstream P2P bridge 1040 determines whether or not the packet is transmitted from a downstream port. When the packet is transmitted from a downstream port, the process proceeds to step S307. On the other hand, when the packet is not transmitted from a downstream port, the process proceeds to step S308.

In step S307, the upstream P2P bridge 1040 sets an upstream port as the destination port. The processing then ends.

In step S308, the upstream P2P bridge 1040 outputs an error indicating that no packet transfer destination exists.

Figure 18:
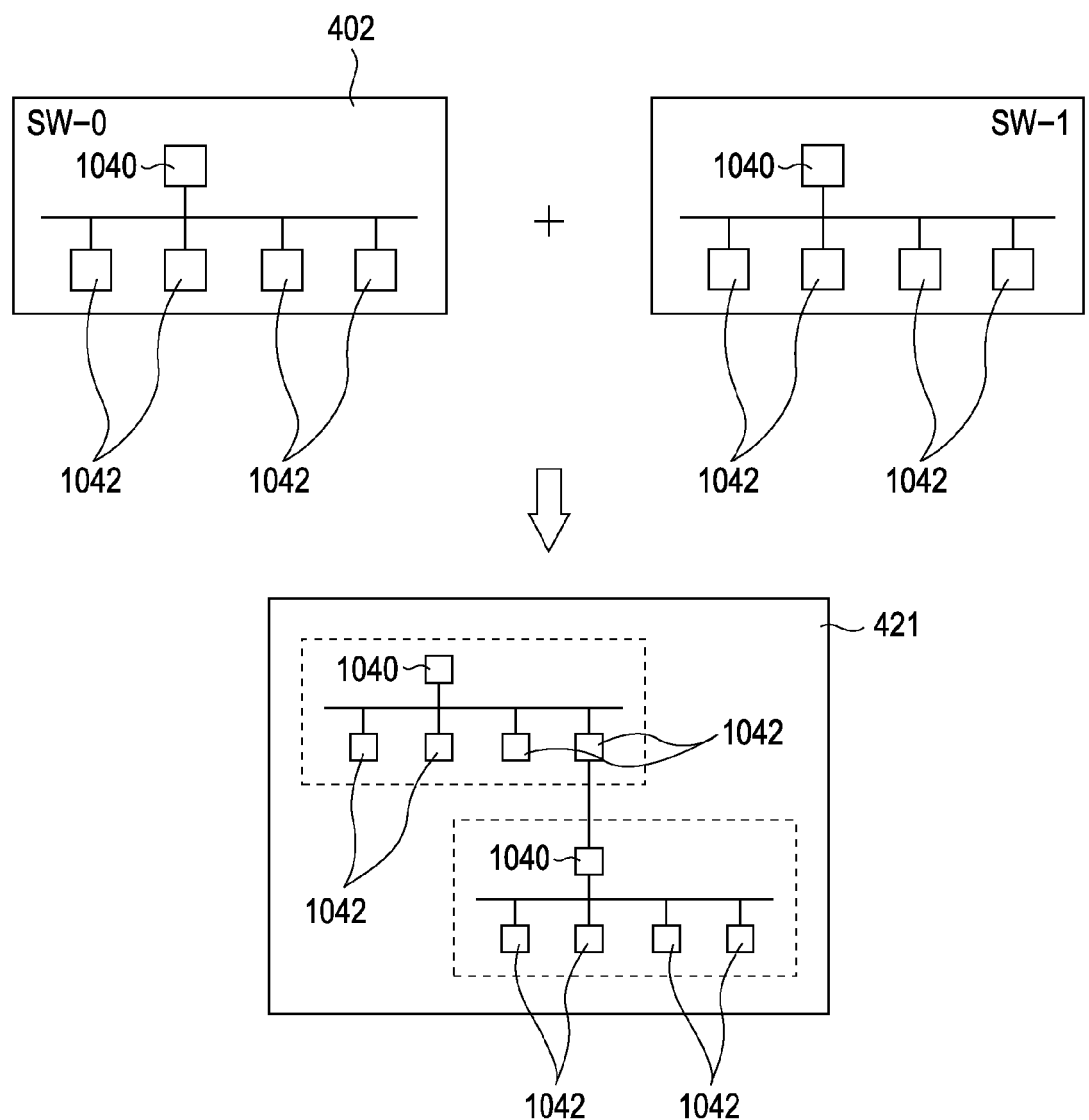
FIG. 18 is a diagram illustrating an advantage of the first embodiment.

An advantage of the first embodiment will now be described with reference to FIG. 18. For example, when two PCIe switches are connected in a manner in which an upstream port and a downstream port are combined as in a switch system 421 illustrated in FIG. 18, a bus number used in the system and the number of hierarchical levels up to the endpoints each increase by two compared to the case of a single switch. In contrast, according to the first embodiment, since two PCIe switches are connected through a virtual link, a bus number used in the system and the number of hierarchical levels up to the endpoints do not increase. Therefore, even when multiple switches are connected, the bus hierarchical levels used and the depth in the hierarchy can be maintained constant.

Figure 19:
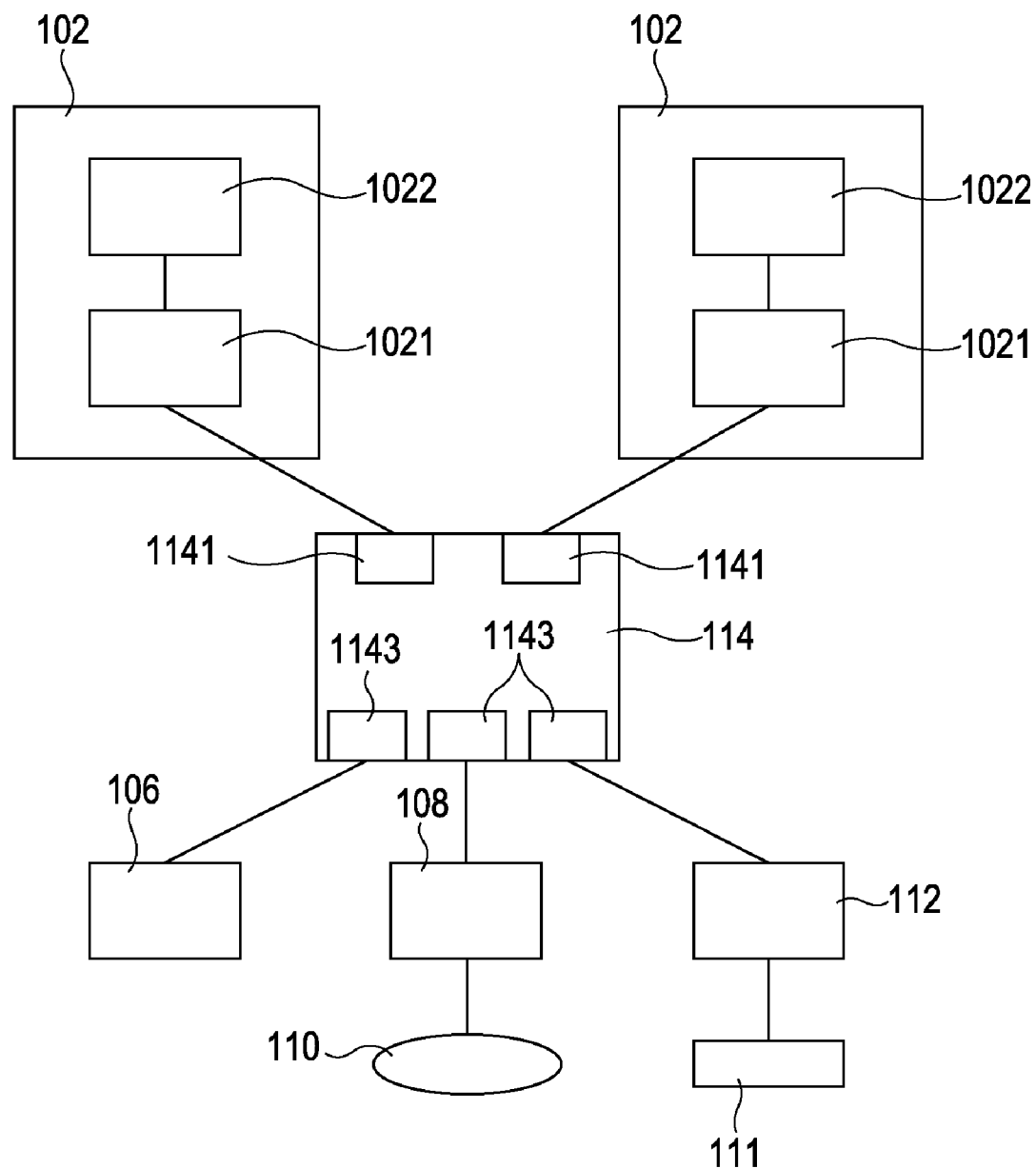
FIG. 19 is a diagram illustrating a system according to a second embodiment.

FIG. 19 is a block diagram of a system 101 according to a second embodiment. In FIG. 19, elements that are similar to those in the first embodiment are denoted by the same reference numerals. There is a demand to use logically divided (partitioned) ones of a system having multiple hosts, such as for servers or PCs. The system 101 meets the demand. The system 101 has a first host bridge 1021 and a second host bridge 1021. Since the multiple host bridges 1021 are provided, the PCIe switch also requires partitioning. As a technology for logically dividing a PCIe switch having multiple switch chips, Multi-Root I/O Virtualization (MR-IOV) has been standardized by the Peripheral Component Interconnect Special Interest Group (PCI-SIG).

Figure 20:
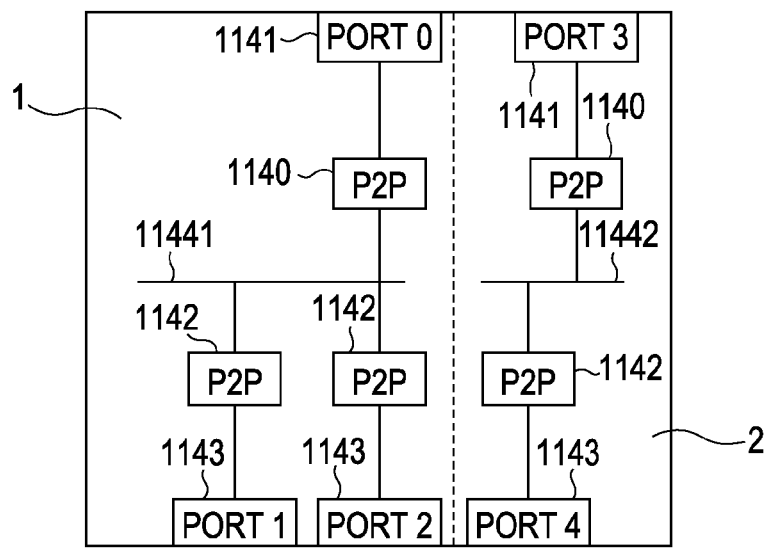
FIG. 20 is a diagram illustrating a PCIe system in the second embodiment.

FIG. 20 illustrates logical division of a PCIe switch 114 in the present embodiment. The PCIe switch 114 has a partition 1 and a partition 2. The partition 1 has an upstream port 1141, an upstream P2P bridge 1140, downstream P2P bridges 1142, and downstream ports 1143. The upstream P2P bridge 1140 and the downstream P2P bridges 1142 are interconnected through an internal PCI bus 11441. The partition 2 has an upstream port 1141, an upstream P2P bridge 1140, a downstream P2P bridge 1142, and a downstream port 1143. The upstream P2P bridge 1140 and the downstream P2P bridge 1142 are interconnected through an internal PCI bus 11442.

Figure 21:
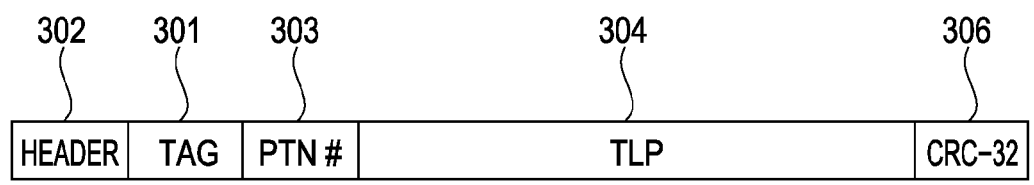
FIG. 21 is a diagram illustrating one example of a packet format in the second embodiment.

FIG. 21 illustrates one example of the format of a packet. A packet 310 has a header 302, a tag 301, a PTN#303, a TLP 304, and a CRC-32 306. Elements described in FIG. 5 are denoted by the same reference numbers, and descriptions thereof are not given hereinbelow. The tag 301 is a header for identifying the start of the PTN#303. The PTN#303 indicates a partition number. In the present embodiment, for example, the header 302 has 2 bytes, the tag 301 has 2 bytes, the PTN#303 has 2 bytes, the TLP 304 has 12 to 4116 bytes, and the CRC-32 306 has 4 bytes.

Figure 22:
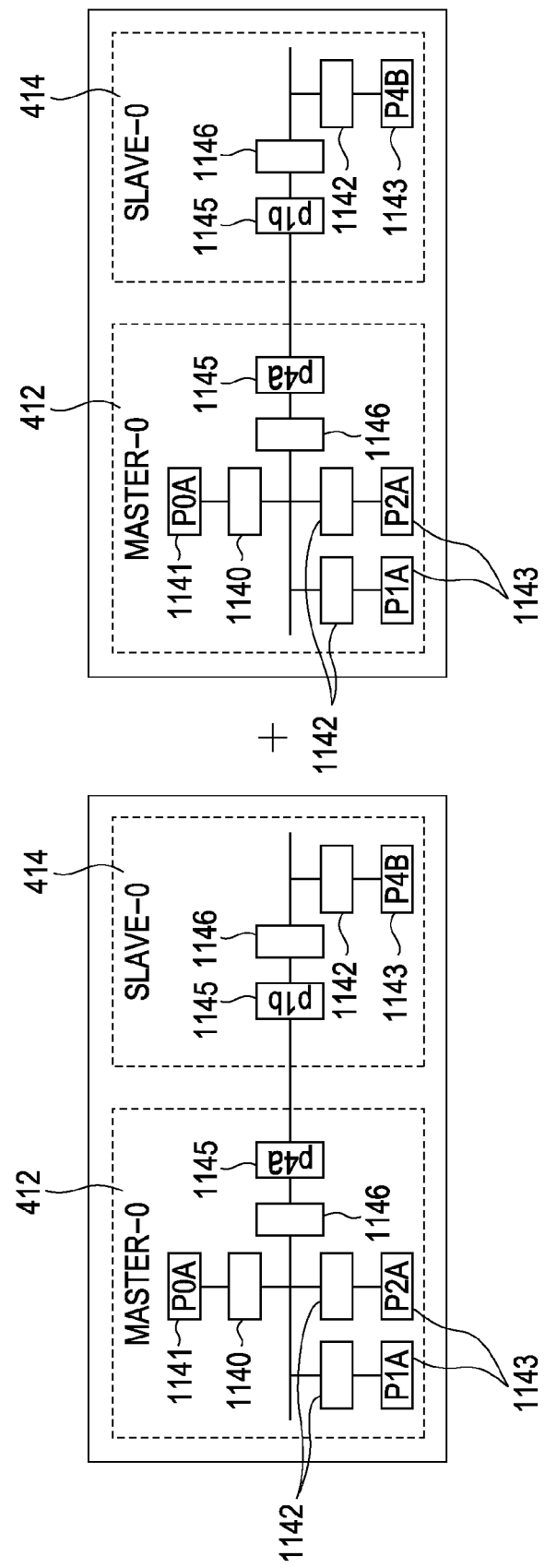
FIG. 22 is a diagram illustrating a switch system in the second embodiment.
Figure 23:
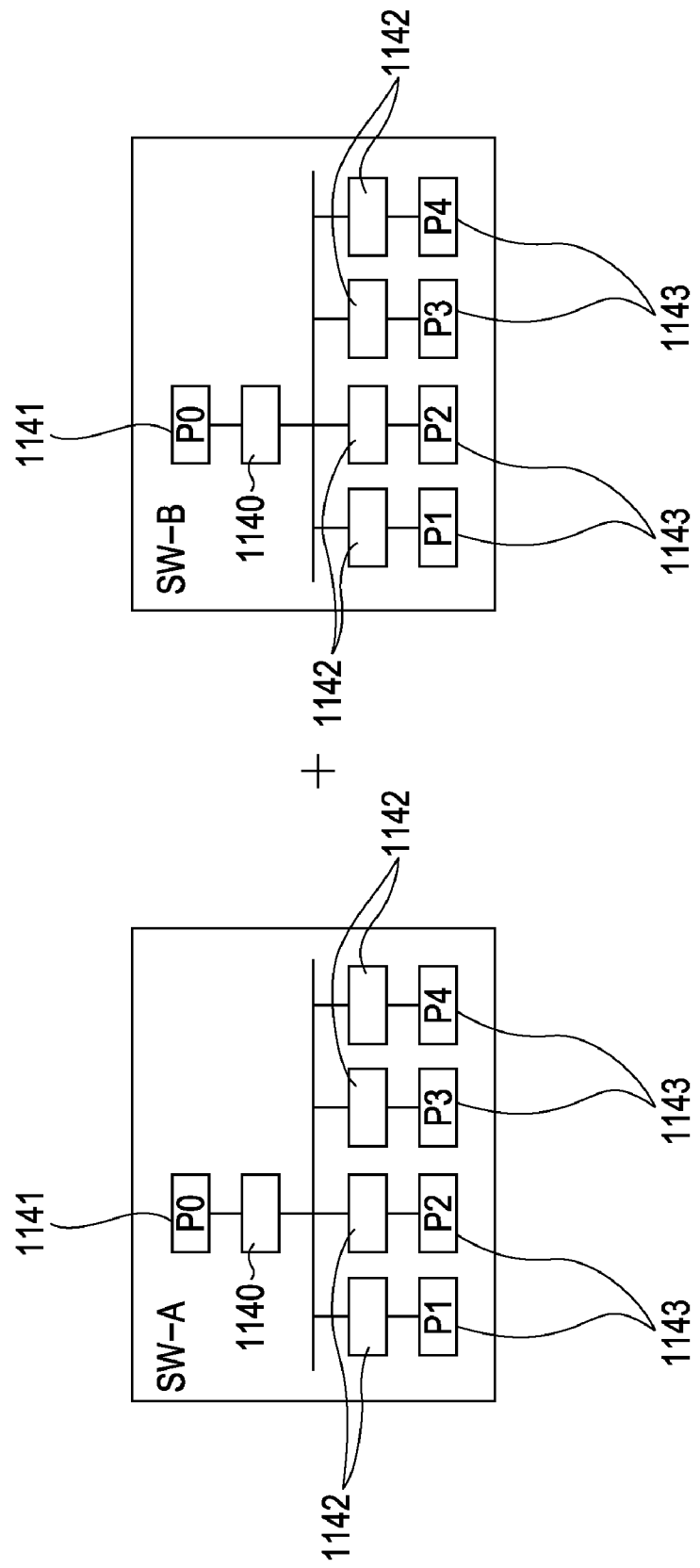
FIG. 23 is a diagram illustrating switches before connection in the second embodiment.

FIG. 22 illustrates a switch system 411 in the present embodiment. The switch system 411 illustrated in FIG. 22 has a configuration in which two switches illustrated in FIG. 23 are connected. Of switches to be connected, a switch that is the closest to the host bridge 1021 is referred to as a master switch 412 and another switch is referred to as a slave switch 414. A dedicated link that is called a virtual link provides a connection between the master switch 412 and the slave switch 414. Ports to which the virtual link is connected are called virtual ports 1145. When N switches are connected in the system, the master switch 412 has N−1 virtual ports 1145 and the slave switch 414 has one virtual port.

A P2P bridge 1146 is connected to each virtual port 1145. The P2P bridge 1146 first determines whether or not a command transmitted from the OS/BIOS is a configuration access command. When the command is a configuration access command, the virtual port 1145 transmits the command to the connected switch.

Figure 24:
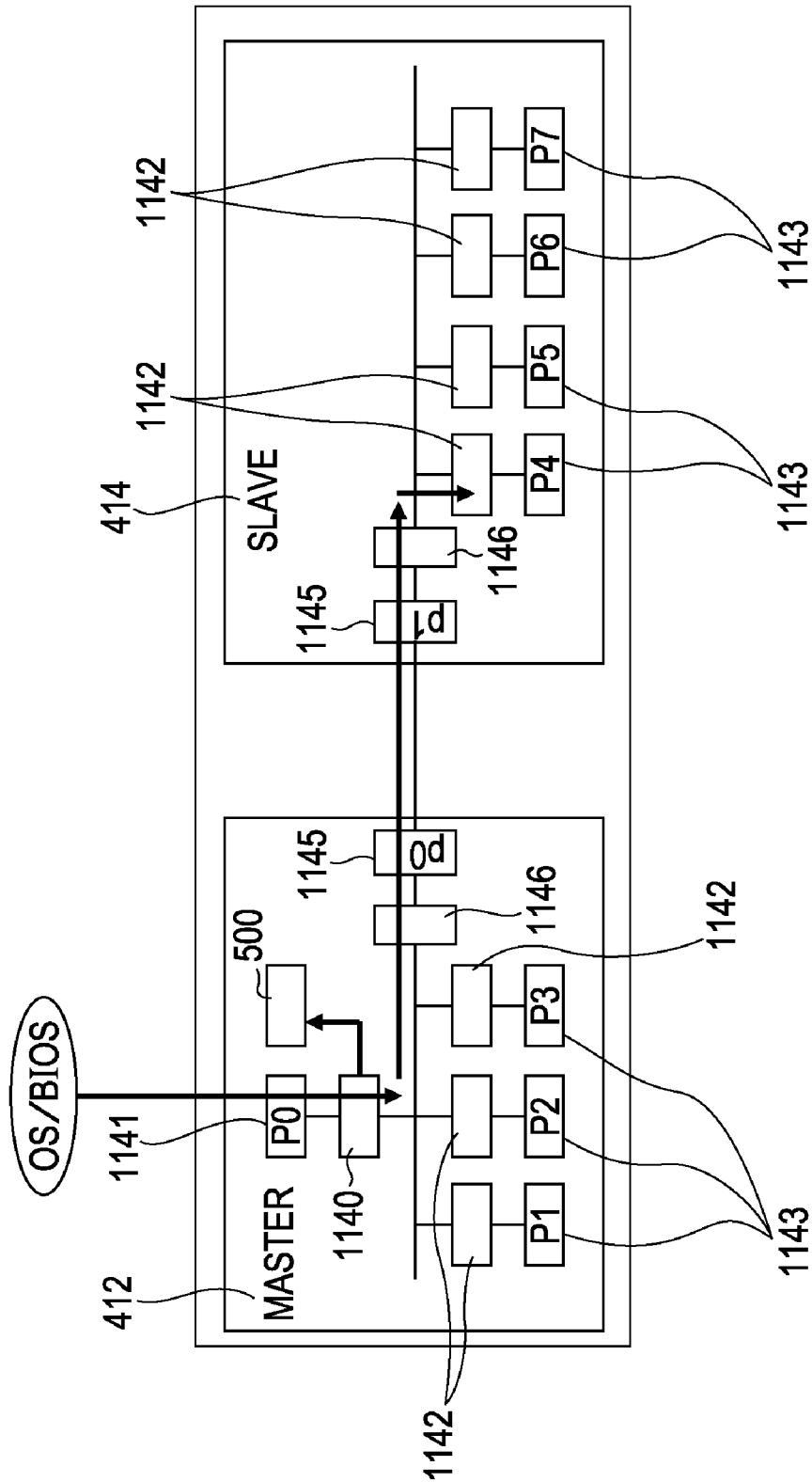
FIG. 24 is a diagram illustrating a switch system in the second embodiment.

FIG. 24 illustrates a switch system 420. A master switch 412 has configuration information of the master switch 412 and a slave switch 414 as a configuration information table 500.

FIG. 25 illustrates a partition table 600. The partition table 600 has partition numbers 602, switch numbers 604, port numbers 606, transfer port numbers 608, and downstream port numbers 610. The partition numbers 602 indicates indices. The switch numbers 604 and the port numbers 606 are upstream port information. The transfer port numbers 608 and the downstream port numbers 610 are local-switch information. The partition table 600 is set by, for example, software during determination of partition configuration.

Figure 26:
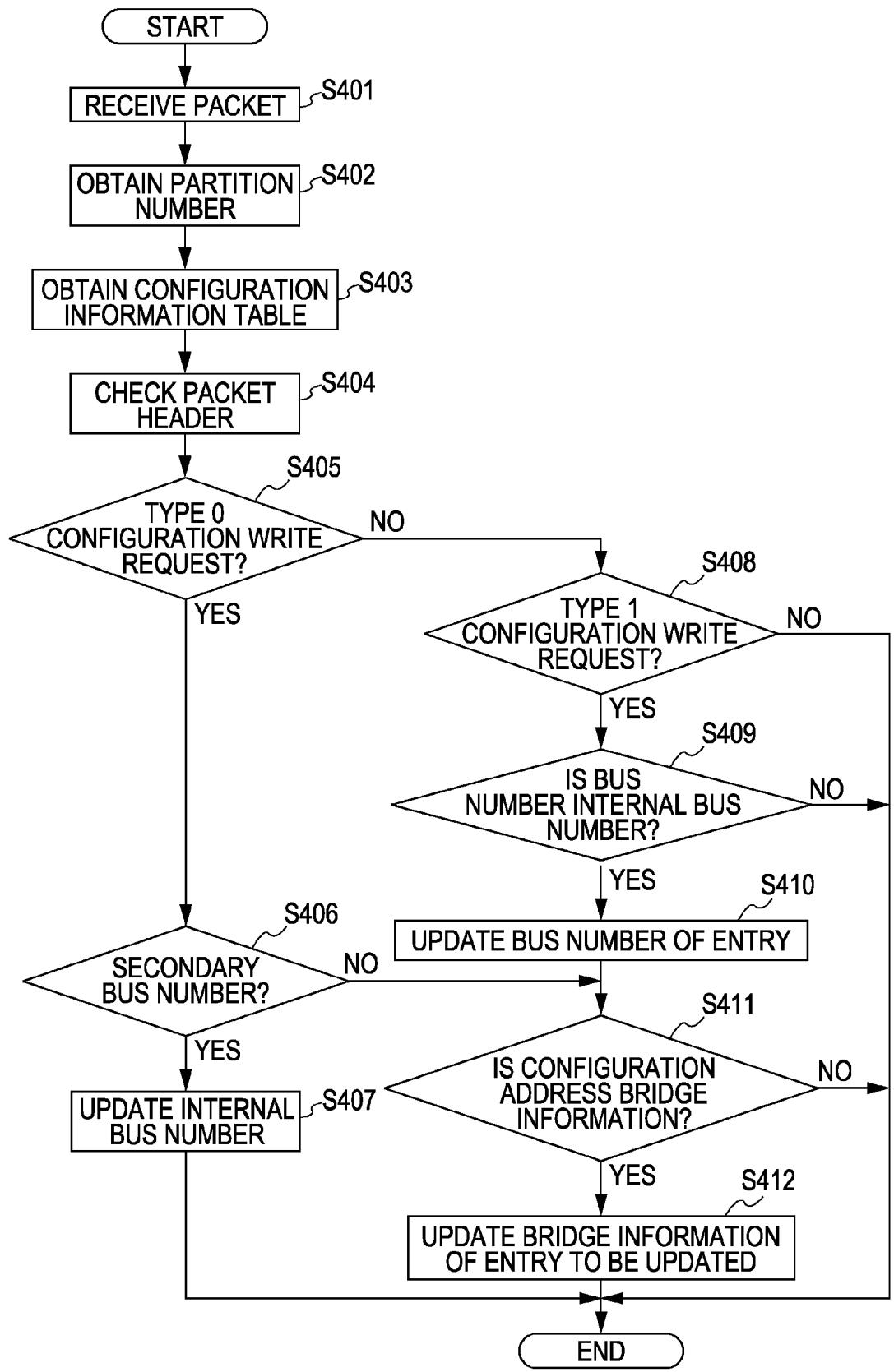
FIG. 26 is a flowchart illustrating processing for updating a configuration information table in the second embodiment.

Processing for updating the configuration information table will now be described with reference to FIG. 26.

In step S401, the upstream P2P bridge 1140 of the master switch 412 receives a packet. The process then proceeds to step S402.

In step S402, the upstream P2P bridge 1140 obtains a partition number from the reception port number of the packet. The process then proceeds to step S403.

In step S403, the upstream P2P bridge 1140 obtains a configuration information table corresponding to the partition number obtained in step S402. The process then proceeds to step S404.

In step S404, the upstream P2P bridge 1140 checks the header of the received packet. The process then proceeds to step S405.

In step S405, the upstream P2P bridge 1140 determines whether or not the received packet is a type 0 configuration write request by referring to the header of the received packet. When the received packet is a type 0 configuration write request, the process proceeds to step S406. On the other hand, when the received packet is not a type 0 configuration write request, the process proceeds to step S408.

In step S406, the upstream P2P bridge 1140 determines whether or not the configuration address of the received packet is a secondary bus number by referring to the header of the received packet. When the configuration address of the received packet is a secondary bus number, the process proceeds to step S407. On the other hand, when the configuration address of the received packet is not a secondary bus number, the process proceeds to step S411.

In step S407, the upstream P2P bridge 1140 updates an internal bus number. The processing then ends.

In step S408, the upstream P2P bridge 1140 determines whether or not the received packet is a type 1 configuration write request by referring to the header of the received packet. When the received packet is a type 1 configuration write request, the process proceeds to step S409. On the other hand, when the received packet is not a type 1 configuration write request, the processing ends.

In step S409, the upstream P2P bridge 1140 determines whether or not the bus number of the packet is an internal bus number by referring to the header of the received packet. When the bus number of the packet is an internal bus number, the process proceeds to step S410. On the other hand, when the bus number of the packet is not an internal bus number, the processing ends.

In step S410, the upstream P2P bridge 1140 refers to the device number in the packet, sets an entry to be processed in the configuration information, and updates the bus number in the entry. The process then proceeds to step S411.

In step S411, the upstream P2P bridge 1140 determines whether or not the configuration address is bridge information by referring to the device number in the packet. When the configuration address is bridge information, the process proceeds to step S412. On the other hand, when the configuration address is not bridge information, the proceeding ends.

In step S412, the master switch 412 updates the bridge information of the entry to be updated, the entry being set in step S410. The processing then ends.

Figure 27:
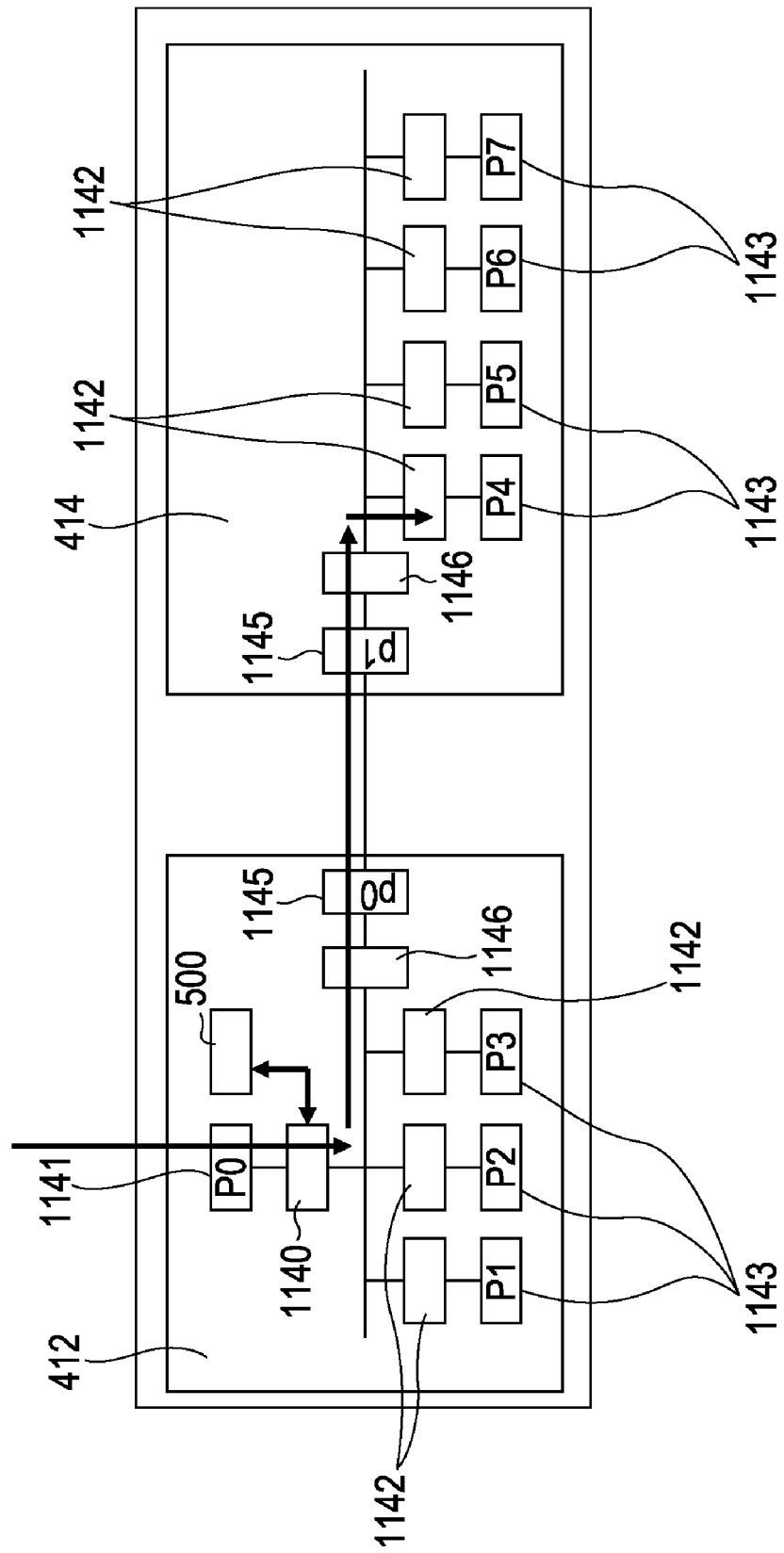
FIG. 27 is a diagram illustrating routing of a packet received by a master switch.
Figure 28:
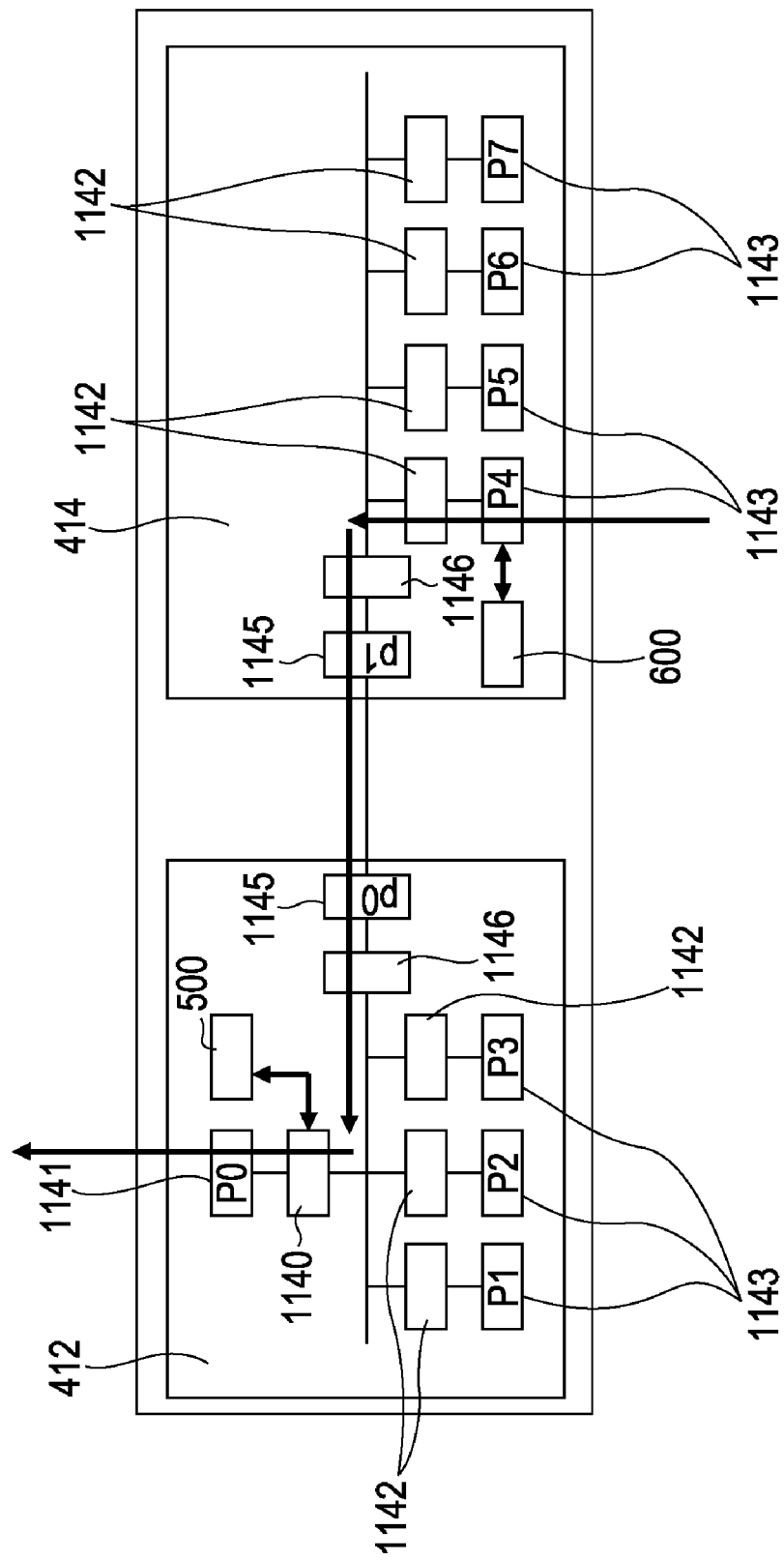
FIG. 28 is a diagram illustrating routing of a packet received by a slave switch.

A packet routing scheme will now be described with reference to FIGS. 27 and 28. FIG. 27 illustrates routing of a packet received at a port of the master switch 412. First, the header of a packet is analyzed at the reception port and a request is issued to the configuration information table 500 to resolve the destination. Depending on the type of packet, the configuration information table 500 determines the destination port of the packet on the basis of a number association table and bus range cache (ID routing) or address range cache (address routing). When the destination port of the packet is in the slave switch 414, the packet is transferred to the virtual port 1145 corresponding to the virtual link. A packet through which the packet is to be transferred is obtained from the partition table 600 in accordance with the partition number of the reception port of the packet. The slave switch 414 performs processing that is analogous to that of a typical PCIe switch. On the other hand, FIG. 28 illustrates routing of a packet received at the port of the slave switch 414. The reception port transfers the packet to the master switch 412 through the virtual link. The master switch 412 routes the packet in accordance with the above-described procedure. A port through which the packet is to be transferred is obtained from the partition table 600 in accordance with the partition number of the reception port of the packet.

Figure 29:
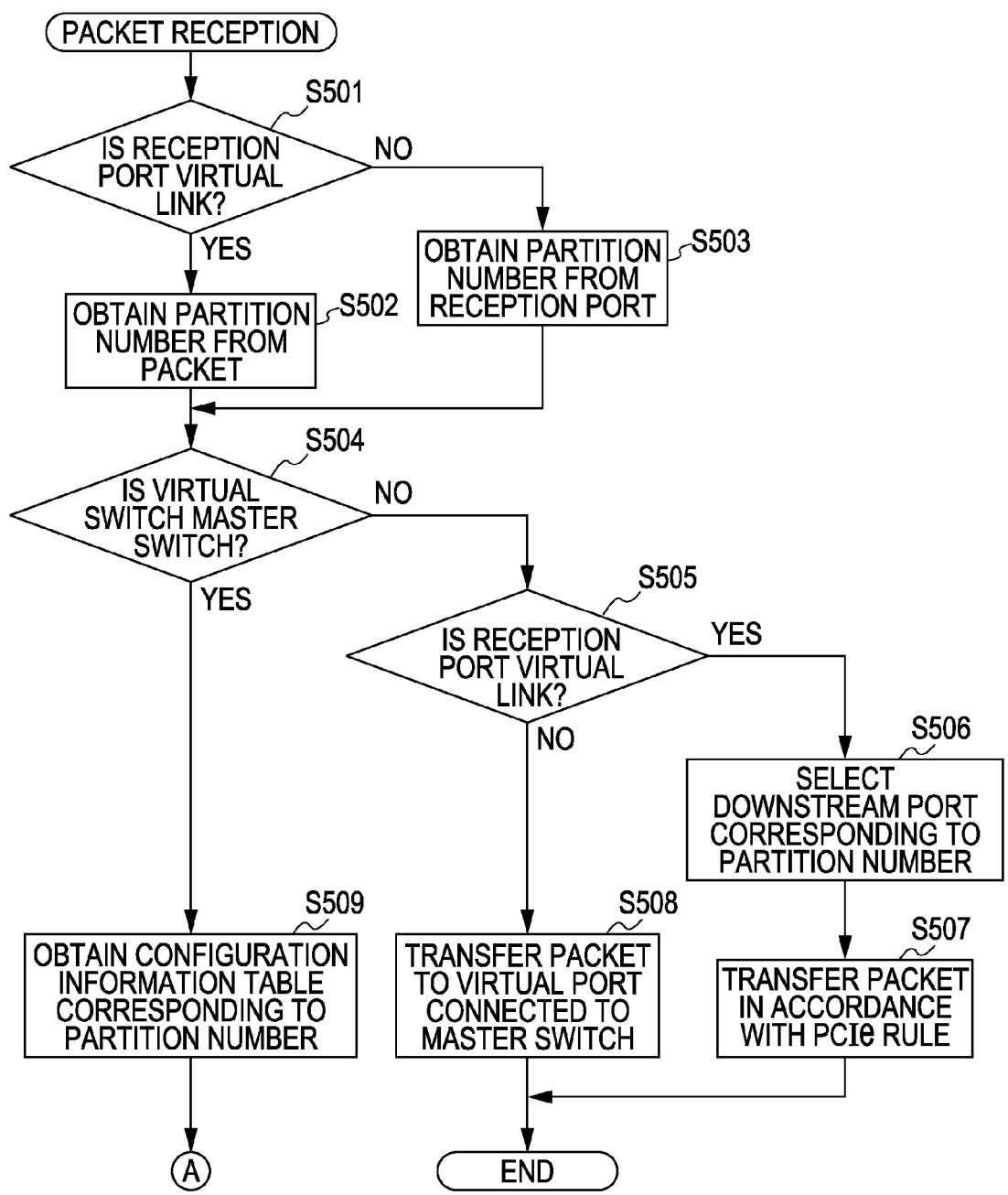
FIG. 29 is a flowchart illustrating packet transfer processing in the second embodiment.
Figure 30:
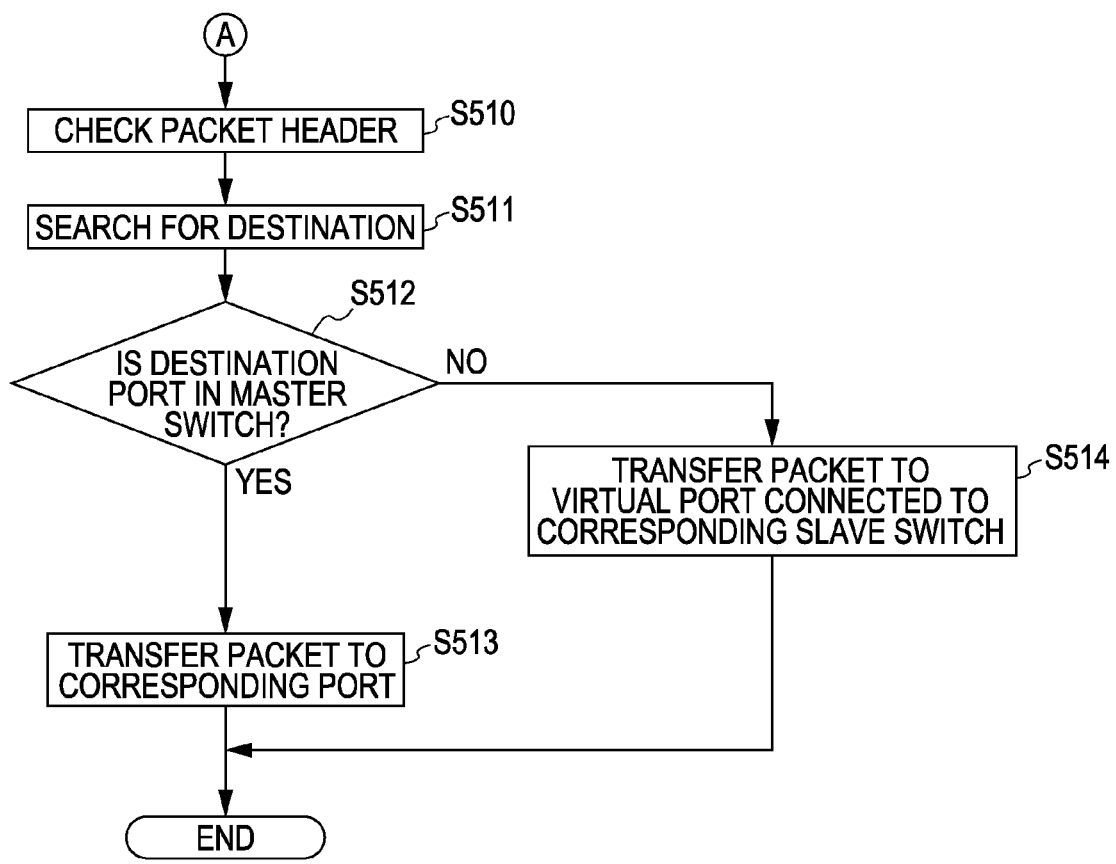
FIG. 30 is a flowchart illustrating the packet transfer processing in the second embodiment.

Packet transfer processing will now be described with reference to FIGS. 29 and 30.

In step S501, the upstream P2P bridge 1140 of the master switch 412 that has received a packet determines whether or not the reception port thereof is a virtual link. When the reception port is a virtual link, the process proceeds to step S502. On the other hand, when the reception port is not a virtual link, the process proceeds to step S503.

In step S502, the upstream P2P bridge 1140 obtains a partition number from the packet obtained in step S501. The process then proceeds to step S504.

In step S503, the upstream P2P bridge 1140 obtains a partition number from the number of the reception port. The process then proceeds to step S504.

In step S504, the upstream P2P bridge 1140 determines whether or not a virtual switch corresponding to the partition number is a master switch. When the virtual switch corresponding to the partition number is a master switch, the process proceeds to step S509. On the other hand, when the virtual switch corresponding to the partition number is not a master switch, the process proceeds to step S505.

In step S505, the upstream P2P bridge 1140 determines whether or not the reception port is a virtual link. When the reception port is a virtual link, the process proceeds to step S506. On the other hand, when the reception port is not a virtual link, the process proceeds to step S508.

In step S506, the downstream P2P bridge 1142 selects a downstream port corresponding to the partition number. The process then proceeds to step S507.

In step S507, the downstream P2P bridge 1142 transfers the packet in accordance with a PCI Express rule. The processing then ends.

In step S508, the downstream P2P bridge 1142 transfers the packet to the virtual port 1145 connected to the master switch 412. The processing then ends.

In step S509, the downstream P2P bridge 1142 obtains a configuration information table corresponding to the partition number. The process then proceeds to step S510 in FIG. 30.

In step S510, the upstream P2P bridge 1140 checks the header of the received packet. The process then proceeds to step S511.

In step S511, the upstream P2P bridge 1140 searches for the destination of the received packet. Since the destination search processing is analogous to that described with reference to FIG. 17, a description thereof is not given hereinbelow. After step S511, the process proceeds to step S512.

In step S512, the upstream P2P bridge 1140 determines whether or not the destination of the received packet is in the master switch 412. When the destination of the packet is in the master switch 412, the process proceeds to step S513. On the other hand, when the destination of the packet is not in the master switch 412, the process proceeds to step S514.

In step S513, the upstream P2P bridge 1140 transfers the packet to a corresponding port in the master switch 412. The processing then ends.

In step S514, the upstream P2P bridge 1140 transfers the packet to the virtual port 1145 of the corresponding slave switch 414. The processing then ends.

Figure 31:
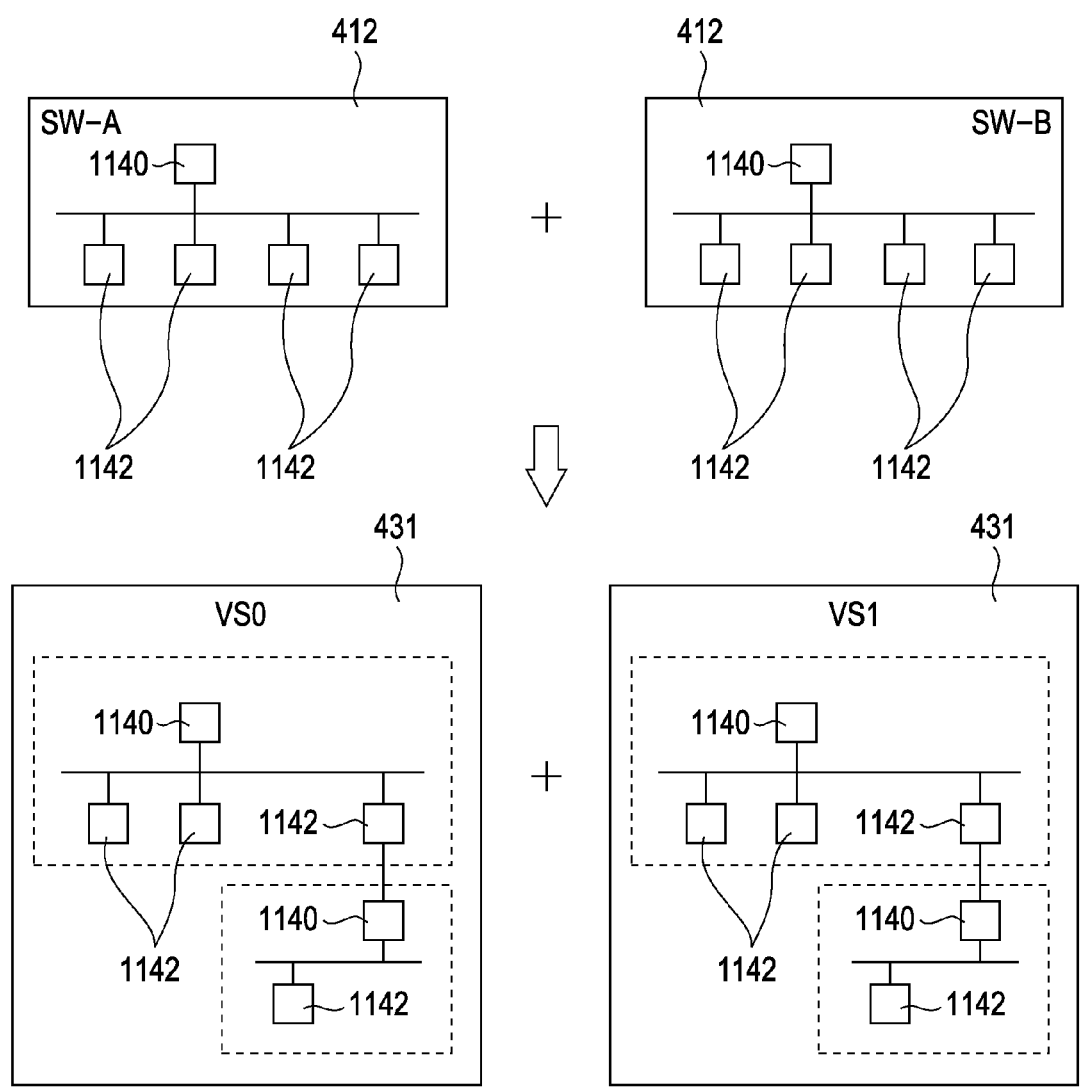
FIG. 31 illustrates an advantage of the second embodiment.

An advantage of the second embodiment will now be described with reference to FIG. 31. For example, when two PCIe switches are connected in a manner in which an upstream port and a downstream port are combined as in a switch system 431 illustrated in FIG. 31, a bus number used in the system and the number of hierarchical levels up to the endpoints each increase by two compared to the case of a single switch. In contrast, according to the second embodiment, since two PCIe switches are connected through a virtual link, a bus number used in the system and the number of hierarchical levels up to the endpoints do not increase. Therefore, even when multiple switches are connected, the bus hierarchical levels used and the depth in the hierarchy can be maintained constant.

According to one aspect of an embodiment, since a first switch refers to a table included in the switch to transfer a packet to a second switch or an I/O device corresponding to an address in the packet, the first switch and the second switch can be integrated into a single unit. Accordingly, it is possible to increase the system scale without increasing the number of bus hierarchical levels.

As mentioned above, the present art has been specifically described for better understanding of the embodiments thereof and the above description does not limit other aspects of the invention. Therefore, the present invention can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A switch system connectable to a first I/O device, a second I/O device and a third I/O device, the switch system comprising a first switch and a second switch;
    the first switch comprising:
    a first bus,
    a first bridge connected to the first bus for receiving a packet from the first I/O device and transmitting the received packet to the first bus, the first bridge being capable of transmitting a request to the first bus so as to inquire whether there is any bridge addressed by the packet via the first bus, the first bridge being capable of receiving an acknowledgement from any bridge addressed by the packet via the first bus before transmitting the packet to the first bus,
    a second bridge connected to the first bus for receiving the packet from the first bridge via the first bus, comparing address information of the second bridge with address information included in the packet, and transmitting the packet to the second I/O device when the address information of the second bridge matches with the address information included in the packet, and
    a third bridge connected to the first bus for receiving the packet from the first bridge via the first bus and transmitting the packet to the second switch;
    the second switch comprising:
    a second bus,
    a fourth bridge which receives the packet from the third bridge and transmits the packet via the second bus, and
    a fifth bridge which receives the packet from the fourth bridge via the second bus, compares address information of the fifth bridge with address information included in the packet, and transmits the packet to the third I/O device when the address information of the fifth bridge matches with the address information included in the packet;
    the first switch has a table including address information of the fifth bridge, and the first bridge determines whether the address information included in the packet matches with the address information of the fifth bridge in reference to the table, and transmits the packet to the fifth bridge when the address information included in the packet matches with the address information of the fifth bridge.

2. The switch system of claim 1, wherein the first bridge transmits the request to the first bus when the address information included in the packet does not match with the address information of the fifth bridge.

3. The switch system of claim 2, wherein the first bridge transmits the packet to the any bridge address by the packet when receiving the acknowledgement.

4. The switch system of claim 1, wherein the fifth bridge transmits a received packet from the third I/O device to the first bridge and the first bridge transmits the packet received from the fifth bridge in reference to the table.

5. The switch system of claim 1, wherein the first bridge updates the table on the basis of a packet received from the first I/O device.

6. A method of controlling a switch system connectable to a first I/O device, a second I/O device and a third I/O device, the switch system including a first switch and a second switch, the method comprising:
    receiving a packet from the first I/O device and transmitting the received packet to a first bus by a first bridge included in the first switch connected to the first bus, the first bridge being capable of transmitting a request to the first bus so as to inquire whether there is any bridge addressed by the packet via the first bus, the first bridge being capable of receiving an acknowledgement from any bridge address by the packet to the first bus before transmitting the packet to the first bus;
    receiving the packet from the first bridge via the first bus, comparing address information of the second bridge with address information included in the packet, and transmitting the packet to the second I/O device when the address information of the second bridge matches with the address information included in the packet by a second bridge included in the first switch, connected to the first bus;
    receiving the packet from the first bridge to the first bus and transmitting the packet via the second switch by a third bridge included in the first switch, connected to the first bus;
    receiving the packet from the third bridge and transmitting the packet to a second bus by a fourth bridge included in the second switch; and
    receiving the packet from the fourth bridge to the second bus, comparing address information of the fifth bridge with address information included in the packet, and transmitting the packet to the third I/O device when the address information of the fifth bridge matches with the address information included in the packet by a fifth bridge included in the second switch,
    the first switch has a table including address information of the fifth bridge, and the first bridge determines whether the address information included in the packet matches with the address information of the fifth bridge in reference to the table, and transmits the packet to the fifth bridge when the address information included in the packet matches with the address information of the fifth bridge.

7. The method of claim 6, wherein the first bridge transmits the request to the first bus when the address information included in the packet does not match with the address information of the fifth bridge.

8. The method of claim 7, wherein the first bridge transmits the packet to the any bridge address by the packet when receiving the acknowledgement.

9. The method of claim 6, wherein the fifth bridge transmits a received packet from the third I/O device to the first bridge and the first bridge transmits the packet received from the fifth bridge in reference to the table.

10. The method of claim 6, wherein the first bridge updates the table on the basis of a packet received from the first I/O device.

* * * * *